(12) United States Patent
Perel et al.

(10) Patent No.: US 7,303,278 B2
(45) Date of Patent: Dec. 4, 2007

(54) MULTIFOCAL CONTACT LENS

(75) Inventors: Ivan Maurice Perel, Misgav (IL); Alain Schmulewitsch, Paris (FR)

(73) Assignee: J.B. Associates BV, Amsterdam, Holland ( * ) Notice: Subject to any disclaimer, the term of this patent is extended or adjusted under 35 U.S.C. 154(b) by 0 days.

(21) Appl. No.: 11/529,648

(22) Filed: Sep. 27, 2006

(65) Prior Publication Data

US 2007/0019153 A1    Jan. 25, 2007

Related U.S. Application Data

(60) Division of application No. 10/952,354, filed on Sep. 27, 2004, now Pat. No. 7,101,042, which is a continuation-in-part of application No. 10/640,114, filed on Aug. 12, 2003, now Pat. No. 6,929,366.

(51) Int. Cl.
*G02C 7/02* (2006.01)
(52) U.S. Cl. .................. 351/177; 351/161; 351/160 R; 424/429; 427/2.24
(58) Field of Classification Search ................ 351/177
See application file for complete search history.

(56) References Cited

U.S. PATENT DOCUMENTS

| | | |
|---|---|---|
| 4,869,587 A | 9/1989 | Breger |
| 5,002,382 A | 3/1991 | Seidner |
| 5,024,517 A | 6/1991 | Seidner |
| 5,125,729 A | 6/1992 | Mercure |
| 5,436,678 A | 7/1995 | Carroll |
| 5,493,350 A | 2/1996 | Seidner |
| 5,526,071 A | 6/1996 | Seidner et al. |
| 5,619,289 A | 4/1997 | Seidner et al. |
| 5,691,797 A | 11/1997 | Seidner et al. |
| 5,695,509 A | 12/1997 | El Hage |
| 5,754,270 A | 5/1998 | Rehse et al. |
| 5,771,088 A | 6/1998 | Perrott |
| 5,835,187 A | 11/1998 | Martin |
| 5,864,379 A | 1/1999 | Dunn |
| 5,898,473 A | 4/1999 | Seidner et al. |
| 6,010,219 A * | 1/2000 | Stoyan .................... 351/160 R |
| 6,030,077 A | 2/2000 | Sawano et al. |
| 6,116,735 A | 9/2000 | Wada |
| 6,161,544 A * | 12/2000 | DeVore et al. .............. 128/898 |
| 6,244,709 B1 | 6/2001 | Vayntraub et al. |
| 6,260,966 B1 | 7/2001 | Sawano et al. |
| 6,357,876 B1 | 3/2002 | Oyama et al. |
| 6,457,826 B1 | 10/2002 | Lett |
| 6,537,545 B1 * | 3/2003 | Karageozian et al. ...... 424/94.4 |
| 6,540,353 B1 | 4/2003 | Dunn |

(Continued)

*Primary Examiner*—Jessica T Stultz
(74) *Attorney, Agent, or Firm*—Abelman, Frayne & Schwab

(57) ABSTRACT

A contact lens formed from a transparent material having front and rear surfaces, wherein the rear surface has a base curve which is adapted to fit an eye of a wearer of the lens. The front surface has a central zone which has two different cylindrical curvatures which generate first and second central-zone refractive powers differing by an astigmatic factor. The front surface also has an outer zone with two different cylindrical curvatures which generate third and fourth central-zone refractive powers differing by the astigmatic factor, and an intermediary region, intermediate the central zone and the outer zone, having one or more contiguous intermediate zones, each intermediate zone having cylindrical curvatures differing by the astigmatic factor. The refractive powers from the central zone to the outer zone form monotonic progressions of decreasing values.

10 Claims, 4 Drawing Sheets

U.S. PATENT DOCUMENTS 6,733,124 B2 * 5/2004 Miyamura et al. .......... 351/161
2002/0036748 A1 3/2002 Chapoy et al.
2002/0186345 A1 12/2002 Duppstadt
2003/0043342 A1 3/2003 Seidner
2003/0076478 A1 4/2003 Cox

* cited by examiner

MULTIFOCAL CONTACT LENS

RELATED APPLICATION

This application is a Divisional of U.S. application Ser. No. 10/952,354, filed Sep. 27, 2004, now U.S. Pat. No. 7,101,042, which is a Continuation-in-Part of application Ser. No. 10/640,114, filed Aug. 12, 2003, now U.S. Pat. No. 6,929,366, both of which are incorporated herein by reference.

FIELD OF THE INVENTION

The present invention relates generally to contact lenses, and specifically to multifocal contact lenses.

BACKGROUND OF THE INVENTION

Accommodation enables a person of normal vision to focus on objects from infinity to a near point, typically of the order of 25 cm or less from the eye. A presbyope has lost the ability to accommodate over such a large range, and typically requires two corrections: a distance correction for focussing to infinity, and a near correction for focussing to close objects. Corrections, which are typically different for each eye, are usually prescribed to a quarter of a diopter, and may range between approximately +8 and −8 diopters for both the distance correction and the near correction.

Multifocal spectacles provide the two corrections for each eye, as well as intermediate corrections, in separate regions of one lens. Such spectacles rely on the fact that the spectacle lenses are relatively fixed with respect to the eye, so that the spectacle wearer usually looks through the higher portions of the lens for distant objects, and the lower portion of the lens for near objects.

Multifocal contact lenses that provide both corrections for a particular eye in a single lens are known in the art. However, unlike spectacle lenses, contact lenses move with the motion of the eye. Thus, multifocal contact lenses known in the art use a number of different systems to enable a presbyope to be adequately corrected for viewing both near and distant objects. Unfortunately, not all of these systems have been well received by users.

U.S. Pat. No. 5,125,729, to Mercure, whose disclosure is incorporated herein by reference, describes a lens which has, on its front surface, a central spherical circular area which is surrounded by an annular aspherical area. The central area is responsible for distance vision. The annular aspherical area enables vision at all distances including reading.

U.S. Pat. No. 5,526,071, to Seidner et al., whose disclosure is incorporated herein by reference, describes a diagnostic contact lens. After diagnosis involving an over-refraction process, the patient is fitted with a prescription lens. The prescription lens has two front annular aspheric surfaces, or in the case where intermediate vision is to be accommodated, three (or more) front aspheric surfaces. The distance vision area is a central area of the lens, while the near vision area is one of the annular areas in the periphery of the front surface of the lens.

U.S. Pat. Nos. 5,619,289 and 5,691,797 to Seidner et al., whose disclosures are incorporated herein by reference, describe a lens having a front central aspheric surface for distance vision correction with a diameter of about 1.5-2.5 mm and an eccentricity of about −0.8. A first annular surface surrounding the central surface is aspheric and has a diameter of about 2.0-3.5 mm. Other annular surfaces have diameters of about 2.3-4.0, and 3.5-8.0, and may be spheric or aspheric.

U.S. Pat. No. 5,754,270 to Rehse et al., whose disclosure is incorporated herein by reference, describes a lens having a central aspheric optic zone with a diopter power equal to the distant power correction, plus an add power range of from 2.5 to 2.25 diopters from center outward. There is a second "blending zone" concentric with the center zone, that provides a rapid power shift of about −0.5 to about −1.25 diopters over a small distance of about 0-0.2 mm, typically about 0.05 mm.

U.S. Pat. Nos. 5,864,379 and 6,540,353 to Dunn, whose disclosures are incorporated herein by reference, describe a lens having a central spherical circular region that is over-corrected for near vision, typically by about 25%-100%, with a diameter of about 1.0-2.5 mm. The central zone is surrounded by up to three annular aspherical zones, the first two having thicknesses of about 0.5 mm, the third having an outer diameter of about 8 mm.

U.S. Pat. Nos. 6,030,077 and 6,260,966 to Sawano et al., whose disclosures are incorporated herein by reference, describe a lens having a central circular spheric region with a first constant power, an intermediate annular aspheric region, and an outer annular spheric region having a second constant power. The radii of different parts of the intermediate region are calculated from two opposing parabolic curves which smoothly connect to each other and to the constant powers of the center and outer zones.

U.S. Pat. No. 6,116,735 to Wada, whose disclosure is incorporated herein by reference, describes a lens having zones which alternate between near- and far-correction zones. Typically there are four zones. A central near-vision zone is approximately 1-2 mm diameter, and the other zones have equal widths of about 0.63 mm.

Other systems for correcting vision are known in the art. For example, U.S. Pat. No. 5,695,509 to El Hage, whose disclosure is incorporated herein by reference, describes a mold for reshaping the cornea. Curvatures of surfaces of the mold are modifications of the corneal topography of the mold wearer, and include a flattened pressure zone and a relief zone designed to receive displaced corneal tissue.

U.S. Pat. No. 5,771,088 to Perrott, whose disclosure is incorporated herein by reference, describes a contact lens for improving peripheral vision. The contact lens is formed as an "aplanatic fit" lens (stated to be a lens having an aspheric, preferably hyperbolic or parabolic, front surface to correct spherical aberration). In addition to an aplanatic central zone, the lens has an outer spherical zone.

Correct provision of a multifocal contact lens for a specific eye typically requires knowledge of both the near and far correction of the eye of the patient. Since both corrections are typically prescribed to within a quarter of a diopter, it will be appreciated that there are a large number of near- and far-combinations. Notwithstanding that certain multifocal lenses known in the art, including some of those described above, claim to be suitable for ranges of prescriptions, there is a need for an improved multifocal contact lens.

SUMMARY OF THE INVENTION

In some embodiments of the present invention, a contact lens acts as a multifocal lens for correcting vision, typically the vision of a presbyope. A front surface of the contact lens comprises a plurality of curved zones which, when taken with a base curve of a rear surface of the lens, have different powers, the different powers decreasing monotonically from a central to an outer zone of the lens. The overall effect of the decreasing powers enables a wearer of the lens to clearly see both near and far objects.

In one embodiment, the contact lens also corrects astigmatism. Each of the zones has different cylindrical curvatures along two respective axes, the difference in curvatures being selected to compensate for astigmatism of the wearer. The central zone, taken together with a base curve of the lens, is implemented to correct near vision of the wearer.

In an alternative embodiment, one or more of the zones of the contact lens are formed with one or more non-circular edges, so as to also enhance peripheral vision. Typically each non-circular zone is an elongated oval. The elongation of the zone enhances the peripheral vision of the lens wearer in the direction of the elongation, and by choosing which zones are elongated, the peripheral vision for near, far, or intermediate-distant objects may be enhanced. The selective enhancement of peripheral vision may be advantageously used by lens wearers involved in specific activities, such as drivers requiring enhanced horizontal peripheral vision for far objects, or basketball players requiring enhanced vertical peripheral vision for intermediate objects.

In a further embodiment of the present invention, a mold is provided, which when placed on the cornea of a user of the mold, alters the shape of the cornea to correct the mold user's vision. The mold comprises a surface having a plurality of generally concentric discrete zones. Each of the zones is curved. A central zone is adapted to shape the cornea in a central corneal region to have a central zone refractive power that corrects near vision of the eye. The one or more other zones are adapted to shape the cornea to form respective regions that, in progressing from the central corneal region to an outer region, have monotonically decreasing refractive powers. After removal of the mold from the cornea, the decreasing corneal regional refractive powers enable the usr to focus both near and far objects.

There is therefore provided, according to an embodiment of the present invention, a contact lens, including a transparent material having front and rear surfaces, wherein the rear surface has a base curve which is adapted to fit an eye of a wearer of the lens, and wherein the front surface includes:

a central zone which has a first cylindrical curvature along a first axis and a second cylindrical curvature, different from the first cylindrical curvature, along a second axis, and which, together with the base curve, is configured to generate a first central-zone refractive power along the first axis and a second central-zone refractive power along the second axis, the first and second central-zone refractive powers differing by an astigmatic factor;

an outer zone which has a third cylindrical curvature along the first axis and a fourth cylindrical curvature, different from the third cylindrical curvature, along the second axis, and which, together with the base curve, is configured to generate a first outer-zone refractive power along the first axis which is less than the first central-zone power and a second outer-zone refractive power along the second axis which is less than the first outer-zone refractive power by the astigmatic factor; and an intermediary region, intermediate the central zone and the outer zone, including one or more contiguous intermediate zones, each intermediate zone having a respective fifth cylindrical curvature along the first axis and a sixth cylindrical curvature, different from the fifth cylindrical curvature, along the second axis, so that the one or more intermediate zones, together with the base curve, generate respectively one or more first intermediate-zone refractive powers along the first axis defining a first monotonic progression of decreasing refractive power from the first central-zone refractive power to the first outer-zone refractive power, and one or more second intermediate-zone refractive powers along the second axis defining a second monotonic progression of decreasing refractive power from the second central zone refractive power to the second outer zone refractive power.

Optionally, the base curve has a seventh cylindrical curvature along a third axis, and an eighth cylindrical curvature along a fourth axis.

Typically, the first central-zone refractive power and the second central-zone refractive power are selected to correct near vision of the wearer, and the first outer-zone refractive power is between approximately 1 diopter and approximately 2.5 diopters less than the first central-zone power.

In one embodiment, the central zone is substantially circular, and typically the diameter of the central zone is approximately 2.5 mm.

In an alternative embodiment, the first monotonic progression includes a first smooth progression defined by a first algebraic function giving values of the one or more intermediate-zone refractive powers in terms of the first central-zone refractive power and the first outer-zone refractive power, and wherein the second monotonic progression includes a second smooth progression defined by a second algebraic function giving values of the one or more intermediate-zone refractive powers in terms of the second central-zone refractive power and the second outer-zone refractive power.

Typically, the one or more intermediate zones include two or more intermediate annular zones having different powers, and the two or more intermediate zones have approximately equal widths.

The monotonic progression may include a progression chosen from a linear progression, a geometric progression, and a logarithmic progression.

Optionally, the base curve consists of a spherical curve having a single radius of curvature.

In some embodiments at least one of the central zone, the outer zone, and the intermediary region are configured to maintain the contact lens in a preset alignment.

There is further provided, according to an embodiment of the present invention, a contact lens, including a transparent material having front and rear surfaces, wherein the rear surface includes a base curve which is adapted to fit an eye of a wearer of the lens, and wherein the front surface includes:

a central zone which, together with the base curve, is configured to generate a central zone refractive power;

an outer zone, which has the form of an outer annulus surrounding the central zone, and which, together with the base curve, is configured to generate an outer zone refractive power which is less than the central zone power; and an intermediary region, which has the form of an inner annulus intermediate the central zone and the outer zone, the intermediary region having one or more contiguous intermediate zones which are configured, together with the base curve, to generate respective one or more intermediate zone refractive powers defining a monotonic progression of decreasing refractive power from the central zone to the outer zone, so that the central zone, the one or more intermediate zones, and the outer zone are separated from each other by edges, at least one of which is non-circular.

Typically, the central zone refractive power is selected to correct near vision of the wearer and the outer zone refractive power is between approximately 1 diopter and approximately 2.5 diopters less than the central zone power.

In one embodiment the at least one non-circular edge is oval, and an axis of the oval is selected to enhance peripheral vision of the wearer in a direction defined by the axis.

Alternatively, at least one of the edges is circular.

There is further provided, according to an embodiment of the present invention, a mold for shaping a cornea of a user of the mold, the mold including a surface which includes:

a central zone which is curved and which is adapted to shape the cornea in a central corneal region to have a central zone refractive power;

an outer zone which is curved and which is adapted to shape the cornea in an outer corneal region to have an outer zone refractive power which is less than the central zone refractive power; and an intermediary region, intermediate the central zone and the outer zone, having one or more contiguous intermediate zones, each of which is curved and which is adapted to shape the cornea to have respective one or more intermediate zone refractive powers defining a monotonic progression of decreasing refractive power from the central zone to the outer zone.

Typically, the central zone refractive power is selected to correct near vision of the user, and the outer zone refractive power is between approximately 1 diopter and approximately 2.5 diopters less than the central zone refractive power.

There is further provided, according to an embodiment of the present invention, a contact lens, including a transparent material having front and rear surfaces, wherein the rear surface includes a base curve which is adapted to fit an eye of a wearer of the lens, and wherein the front surface includes:

a central circular zone which is spherically curved and which, together with the base curve, is configured to generate a central zone refractive power;

an annular outer zone which is spherically curved and which, together with the base curve, is configured to generate an outer zone refractive power which is less than the central zone power; and an annular region, intermediate the central zone and the outer zone, including one or more contiguous intermediate annular zones, each of which is spherically curved, the one or more intermediate annular zones being configured, together with the base curve, to generate respective one or more intermediate zone refractive powers defining a monotonic progression of decreasing refractive power from the central zone to the annular outer zone.

Typically, the contact lens has dimensions according to any one example set out in tables I, II, III, IV, V, and VI below.

In one embodiment, the outer zone refractive power is between approximately 1 diopter and approximately 2.5 diopters less than the central zone refractive power, typically the outer zone refractive power is one of approximately 1.25 diopters and approximately 2.00 diopters less than the central zone refractive power.

In an alternative embodiment the transparent material between the central curved zone and the base curve has a first range of refractive indices so that the central curved zone together with the base curve generates the central zone refractive power, the transparent material between the annular outer curved zone and the base curve has a second range of refractive indices so that the annular outer curved zone together with the base curve generates the outer zone refractive power, and the transparent material between the one or more contiguous intermediate annular curved zones and the base curve has respective one or more third ranges of refractive indices so that the one or more intermediate annular curved zones together with the base curve generate the respective one or more intermediate zone refractive powers.

There is further provided, according to an embodiment of the present invention, a method for forming a contact lens, including:

forming on a transparent material a rear surface having a base curve which is adapted to fit an eye of a wearer of the lens; and forming on the transparent material a front surface including:

a central zone which has a first cylindrical curvature along a first axis and a second cylindrical curvature, different from the first cylindrical curvature, along a second axis, and which, together with the base curve, is configured to generate a first central-zone refractive power along the first axis and a second central-zone refractive power along the second axis, the first and second central-zone refractive powers differing by an astigmatic factor, an outer zone which has a third cylindrical curvature along the first axis and a fourth cylindrical curvature, different from the third cylindrical curvature, along the second axis, and which, together with the base curve, is configured to generate a first outer-zone refractive power along the first axis which is less than the first central-zone power and a second outer-zone refractive power along the second axis which is less than the first outer-zone refractive power by the astigmatic factor, and an intermediary region, intermediate the central zone and the outer zone, including one or more contiguous intermediate zones, each intermediate zone having a respective fifth cylindrical curvature along the first axis and a sixth cylindrical curvature, different from the fifth cylindrical curvature, along the second axis, so that the one or more intermediate zones, together with the base curve, generate respectively one or more first intermediate-zone refractive powers along the first axis defining a first monotonic progression of decreasing refractive power from the first central-zone refractive power to the first outer-zone refractive power, and one or more second intermediate-zone refractive powers along the second axis defining a second monotonic progression of decreasing refractive power from the second central zone refractive power to the second outer zone refractive power.

There is further provided, according to an embodiment of the present invention, a method for forming a contact lens, including:

forming on a transparent material a rear surface including a base curve which is adapted to fit an eye of a wearer of the lens; and forming on the transparent material a front surface including:

a central zone which, together with the base curve, is configured to generate a central zone refractive power, an outer zone, which has the form of an outer annulus surrounding the central zone, and which, together with the base curve, is configured to generate an outer zone refractive power which is less than the central zone power, and an intermediary region, which has the form of an inner annulus intermediate the central zone and the outer zone, the intermediary region including one or more contiguous intermediate zones which are configured, together with the base curve, to generate respective one or more intermediate zone refractive powers defining a monotonic progression of decreasing refractive power from the central zone to the outer zone, so that the central zone, the one or more intermediate zones, and the outer zone are separated from each other by edges, at least one of which is non-circular.

There is further provided, according to an embodiment of the present invention, a method for shaping a cornea, including:

providing a mold having a surface which includes:

a central zone which is curved and which is adapted to shape the cornea in a central corneal region to have a central zone refractive power, an outer zone which is curved and which is adapted to shape the cornea in an outer corneal region to have an outer zone refractive power which is less than the central zone refractive power, and an intermediary region, intermediate the central zone and the outer zone, including one or more contiguous intermediate zones, each of which is curved and which is adapted to shape the cornea to have respective one or more intermediate zone refractive powers defining a monotonic progression of decreasing refractive power from the central zone to the outer zone; and applying the mold to the cornea.

There is further provided, according to an embodiment of the present invention, a method for forming a contact lens, including:

forming on a transparent material a rear surface including a base curve which is adapted to fit an eye of a wearer of the lens; and forming on the transparent material a front surface including:

a central circular zone which is spherically curved and which, together with the base curve, is configured to generate a central zone refractive power;

an annular outer zone which is spherically curved and which, together with the base curve, is configured to generate an outer zone refractive power which is less than the central zone power; and an annular region, intermediate the central zone and the outer zone, including one or more contiguous intermediate annular zones, each of which is spherically curved, the one or more intermediate annular zones being configured, together with the base curve, to generate respective one or more intermediate zone refractive powers defining a monotonic progression of decreasing refractive power from the central zone to the annular outer zone.

The present invention will be more fully understood from the following detailed description of the embodiments thereof, taken together with the drawings, a brief description of which follows.

DETAILED DESCRIPTION OF EMBODIMENTS

Figure 1:
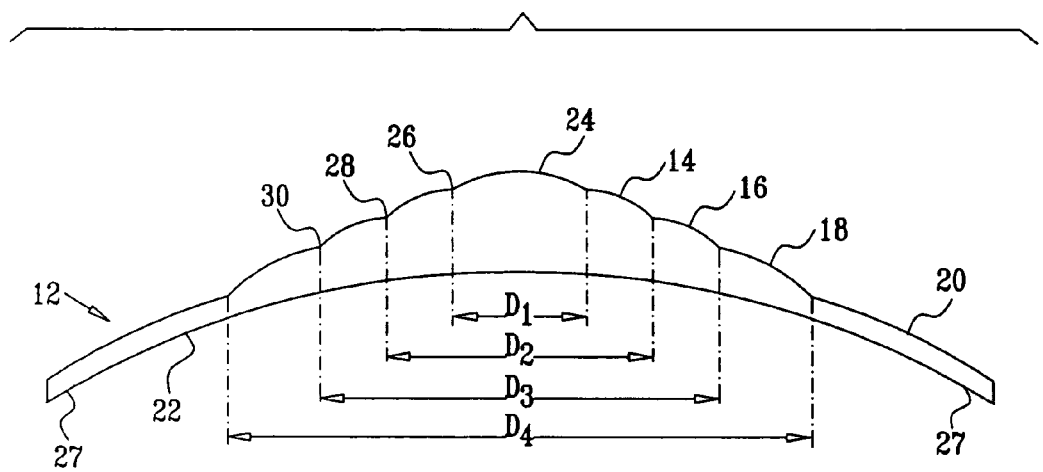
FIG. 1 illustrates schematic top and cross-section views of a multifocal contact lens, according to an embodiment of the present invention.
Figure 1:
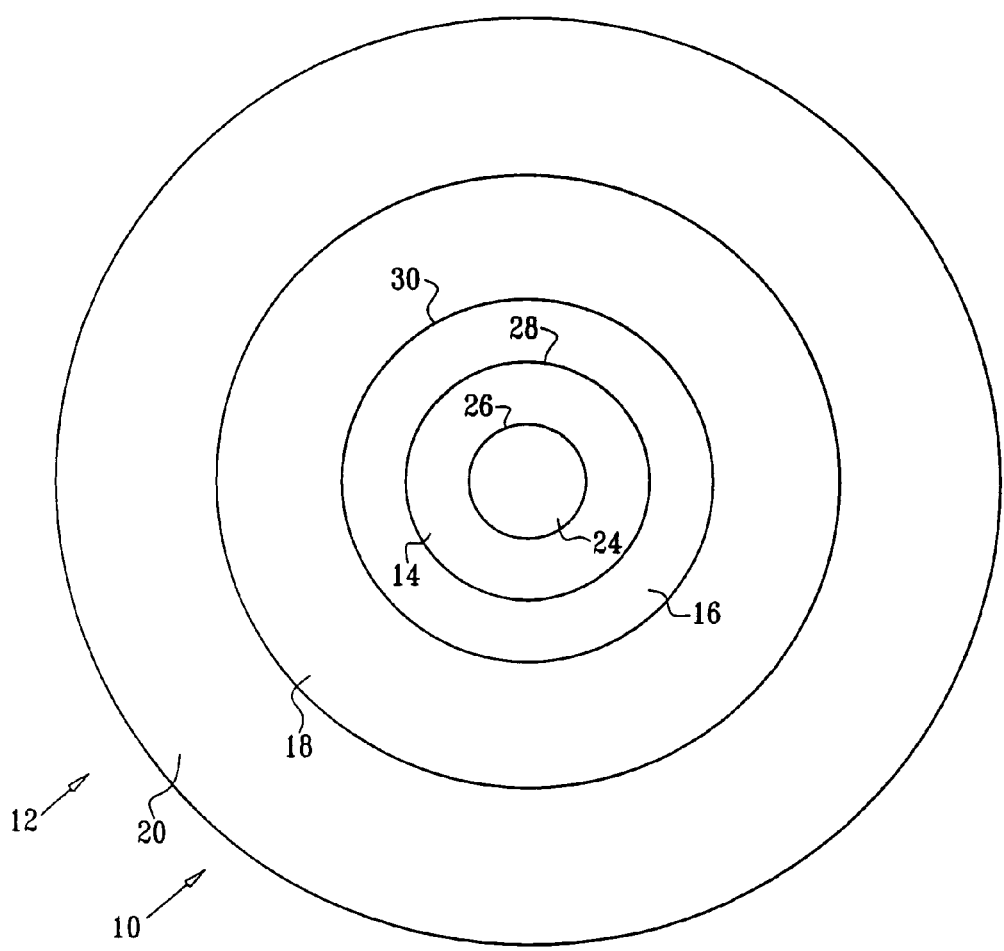

Reference is now made to FIG. 1, which illustrates schematic top and cross-section views of a multifocal contact lens 10, herein also termed multirange lens 10, according to an embodiment of the present invention. Lens 10 is typically formed from a hydratable transparent material, such as Methafilcon A, that is known in the art as being used to produce contact lenses, and that is typically used for producing "soft" contact lenses. Alternatively, lens 10 may be produced from any other transparent material, such as glass or plastic, that is adapted to produce contact lenses, such as material known in the art for producing "hard" contact lenses.

After production, dimensions of lens 10 may alter, typically when the material of the lens hydrates, to "wet" dimensions, which are the dimensions of the lens under normal use. Unless otherwise stated, dimensions of lens 10 given hereinbelow are wet dimensions.

Lens 10 comprises a near surface 22, which is formed as a base curve to fit the eye of the user of the lens. Except where otherwise stated, the base curve is herein assumed to be a curve having a single base curve radius of approximately 8.8 mm. Typically, an annular relief 27, having a width of approximately 0.5 mm, is provided in the base curve for the purposes of easy fitting to the eye.

A far surface 12 of lens 10 comprises a plurality, typically four, of spherical zones which provide optical correction for the eye of the wearer. Far surface 12 also comprises another zone 20, which acts as a substantially optically inactive carrier for the optical zones, and which typically has an outer diameter of approximately 14.2 mm, corresponding to the overall diameter of lens 10. A central circular zone 24, having an outer edge 26, typically has a diameter $D_1$ of approximately 2.5 mm. A central zone spherical radius $R_1$ has a value so that a central zone refractive power $P_1$, which is a function of the central zone radius and the base curve spherical radius, is substantially constant and is approximately equal to the near correction of the lens wearer.

An outer annular zone 18 of surface 12 has an internal diameter $D_3$ of approximately 4.5 mm, and an external diameter $D_4$ of approximately 9 mm. The outer annular zone is formed to have an outer zone spherical radius $R_4$ that, when taken with the base curve, gives an outer zone refractive power $P_4$ that is a preset value less than central zone power $P_1$. Typically, the preset value is a value that is between approximately 1 and approximately 2.5 diopters. In the specification and in the claims, referring to a first power (such as $P_4$) as being less than a second power (such as $P_1$) is to be understood as assuming that the powers are measured in real numbers. For example, a preset value of 2.5 diopters may generate diopter values of ($P_1$=+10, $P_4$=+7.5), ($P_1$=+1.5, $P_4$=−1), and ($P_1$=−10, $P_4$=−12.5).

Between central zone 24 and outer annular zone 18 are two intermediate annular zones, each typically having a width of approximately 0.5 mm. A first intermediate zone 14 with an outer edge 28 is contiguous with central zone 12, and has an external diameter $D_2$ that is approximately 3.5 mm. Intermediate zone 14 is formed to have a first intermediate zone spherical radius $R_2$, which, when taken with the base curve radius, produces a first intermediate zone power of $P_2$. A second intermediate zone 16 with an outer edge 30 is contiguous with first intermediate zone 14 and with zone 18. Intermediate zone 16 is formed to have a second intermediate zone spherical radius $R_3$, which, when taken with the base curve radius, produces a second intermediate zone power of $P_3$. The intermediate zones typically improve the ability of the lens wearer to focus intermediate distances.

Powers $P_2$ and $P_3$ are typically chosen so that $P_1$, $P_2$, $P_3$, and $P_4$ form a monotonic progression, typically a relatively smooth monotonic progression such as a progression that may be defined by an algebraic function giving values of $P_2$, $P_3$ in terms of $P_1$ and $P_4$. In some embodiments of the present invention, powers $P_2$ and $P_3$ are averages of powers $P_1$ and $P_4$, the averages typically being weighted so that $P_1$, $P_2$, $P_3$, and $P_4$ form a substantially linear progression. Thus, powers $P_2$ and $P_3$ are typically derived according to the following equations:

$$P_2 = \frac{(2P_1 + P_4)}{3} \qquad (1)$$

$$P_3 = \frac{(P_1 + 2P_4)}{3} \qquad (2)$$

For example, if the preset value by which $P_4$ is less than $P_1$ is approximately 1.25 diopters, approximate values for $P_2$, $P_3$, and $P_4$ in terms of $P_1$ are given by:

$$P_2 \approx P_1 - 0.42 \qquad (3)$$

$$P_3 \approx P_1 - 0.83 \qquad (4)$$

In this case, for a lens 10 which is to be produced for a presbyope with a near correction of +6.25 diopters, the values of $P_1$, $P_2$, $P_3$, and $P_4$ are respectively approximately +6.25 Ds, +5.83 Ds, +5.42 Ds, and +5.00 Ds.

The expressions of equations (1)-(4) apply for powers $P_2$ and $P_3$ when the progression $P_1$, $P_2$, $P_3$, and $P_4$ is a substantially linear progression. Those skilled in the art will be able to derive equations for $P_2$ and $P_3$, in terms of $P_1$ and $P_4$, for other types of monotonic progression of $P_1$, $P_2$, $P_3$, and $P_4$, such as a logarithmic or a geometric progression.

The powers of each zone are produced by configuring each zone with the zone's respective radius of curvature $R_1$, $R_2$, $R_3$, and $R_4$. Tables I-IV below give values of $R_1$, $R_2$, $R_3$, and $R_4$ for different near corrections (N) corresponding to $P_1$, which the inventors have found in practice give powers corresponding to equations (1) and (2). Values in the tables are for base curves of surface 22 having a radius of 8.5, 8.732, and 9.1 mm, and differences ($P_1$-$P_4$) equal to 1.25 Ds and 2.00 Ds. Tables I-IV also give a center thickness (C. T.) for each lens. The center thickness is calculated assuming that the edge of the lens has a thickness of 0.14 mm.

TABLE I

Base curve radius = 8.5 mm; ($P_1$-$P_4$) = 1.25 Ds

| N ($P_1$) | Central zone ($R_1$) | First Intermediate zone ($R_2$) | Second Intermediate zone ($R_3$) | Outer zone ($R_4$) | C.T. |
|---|---|---|---|---|---|
| 20.00 | 4.0157 | 4.1084 | 4.2010 | 4.2936 | 1.1905 |
| 19.75 | 4.0362 | 4.1287 | 4.2212 | 4.3138 | 1.1642 |
| 19.50 | 4.0570 | 4.1494 | 4.2419 | 4.3343 | 1.1387 |
| 19.25 | 4.0782 | 4.1705 | 4.2628 | 4.3551 | 1.1139 |
| 19.00 | 4.0997 | 4.1919 | 4.2841 | 4.3763 | 1.0898 |
| 18.75 | 4.1217 | 4.2137 | 4.3058 | 4.3979 | 1.0664 |
| 18.50 | 4.1439 | 4.2359 | 4.3278 | 4.4197 | 1.0436 |
| 18.25 | 4.1665 | 4.2583 | 4.3501 | 4.4419 | 1.0214 |
| 18.00 | 4.1895 | 4.2811 | 4.3727 | 4.4644 | 0.9998 |
| 17.75 | 4.2128 | 4.3042 | 4.3957 | 4.4872 | 0.9787 |
| 17.50 | 4.2364 | 4.3277 | 4.4189 | 4.5102 | 0.9581 |
| 17.25 | 4.2603 | 4.3514 | 4.4425 | 4.5336 | 0.9379 |
| 17.00 | 4.2845 | 4.3754 | 4.4663 | 4.5572 | 0.9183 |
| 16.75 | 4.3091 | 4.3998 | 4.4905 | 4.5812 | 0.8991 |
| 16.50 | 4.3339 | 4.4244 | 4.5149 | 4.6054 | 0.8802 |
| 16.25 | 4.3591 | 4.4494 | 4.5396 | 4.6298 | 0.8618 |
| 16.00 | 4.3846 | 4.4746 | 4.5646 | 4.6546 | 0.8438 |
| 15.75 | 4.4103 | 4.5001 | 4.5898 | 4.6796 | 0.8262 |
| 15.50 | 4.4364 | 4.5259 | 4.6154 | 4.7049 | 0.8089 |

TABLE I-continued

Base curve radius = 8.5 mm; ($P_1$-$P_4$) = 1.25 Ds

| N ($P_1$) | Central zone ($R_1$) | First Intermediate zone ($R_2$) | Second Intermediate zone ($R_3$) | Outer zone ($R_4$) | C.T. |
|---|---|---|---|---|---|
| 15.25 | 4.4627 | 4.5519 | 4.6412 | 4.7304 | 0.7919 |
| 15.00 | 4.4893 | 4.5783 | 4.6672 | 4.7561 | 0.7753 |
| 14.75 | 4.5162 | 4.6049 | 4.6935 | 4.7822 | 0.7590 |
| 14.50 | 4.5434 | 4.6318 | 4.7201 | 4.8084 | 0.7430 |
| 14.25 | 4.5709 | 4.6589 | 4.7469 | 4.8349 | 0.7273 |
| 14.00 | 4.5986 | 4.6863 | 4.7740 | 4.8617 | 0.7119 |
| 13.75 | 4.6266 | 4.7140 | 4.8013 | 4.8887 | 0.6967 |
| 13.50 | 4.6549 | 4.7419 | 4.8289 | 4.9159 | 0.6819 |
| 13.25 | 4.6835 | 4.7701 | 4.8567 | 4.9433 | 0.6673 |
| 13.00 | 4.7123 | 4.7985 | 4.8848 | 4.9710 | 0.6529 |
| 12.75 | 4.7413 | 4.8272 | 4.9131 | 4.9989 | 0.6388 |
| 12.50 | 4.7707 | 4.8561 | 4.9416 | 5.0270 | 0.6249 |
| 12.25 | 4.8003 | 4.8853 | 4.9703 | 5.0554 | 0.6113 |
| 12.00 | 4.8301 | 4.9147 | 4.9993 | 5.0839 | 0.5979 |
| 11.75 | 4.8602 | 4.9444 | 5.0285 | 5.1127 | 0.5847 |
| 11.50 | 4.8905 | 4.9743 | 5.0580 | 5.1417 | 0.5717 |
| 11.25 | 4.9211 | 5.0044 | 5.0876 | 5.1709 | 0.5589 |
| 11.00 | 4.9519 | 5.0347 | 5.1175 | 5.2003 | 0.5463 |
| 10.75 | 4.9830 | 5.0653 | 5.1476 | 5.2299 | 0.5340 |
| 10.50 | 5.0143 | 5.0961 | 5.1779 | 5.2597 | 0.5218 |
| 10.25 | 5.0459 | 5.1271 | 5.2084 | 5.2897 | 0.5098 |
| 10.00 | 5.0776 | 5.1584 | 5.2391 | 5.3198 | 0.4980 |
| 9.75 | 5.1096 | 5.1898 | 5.2700 | 5.3502 | 0.4864 |
| 9.50 | 5.1418 | 5.2215 | 5.3011 | 5.3808 | 0.4749 |
| 9.25 | 5.1743 | 5.2534 | 5.3324 | 5.4115 | 0.4637 |
| 9.00 | 5.2069 | 5.2854 | 5.3639 | 5.4424 | 0.4526 |
| 8.75 | 5.2398 | 5.3177 | 5.3956 | 5.4735 | 0.4416 |
| 8.50 | 5.2729 | 5.3502 | 5.4275 | 5.5048 | 0.4309 |
| 8.25 | 5.3062 | 5.3829 | 5.4595 | 5.5362 | 0.4203 |
| 8.00 | 5.3397 | 5.4157 | 5.4918 | 5.5678 | 0.4098 |
| 7.75 | 5.3734 | 5.4488 | 5.5242 | 5.5996 | 0.3995 |
| 7.50 | 5.4072 | 5.4820 | 5.5567 | 5.6315 | 0.3893 |
| 7.25 | 5.4413 | 5.5154 | 5.5895 | 5.6635 | 0.3793 |
| 7.00 | 5.4756 | 5.5490 | 5.6224 | 5.6957 | 0.3695 |
| 6.75 | 5.5100 | 5.5827 | 5.6554 | 5.7281 | 0.3598 |
| 6.50 | 5.5446 | 5.6166 | 5.6886 | 5.7606 | 0.3502 |
| 6.25 | 5.5794 | 5.6507 | 5.7219 | 5.7932 | 0.3408 |
| 6.00 | 5.6144 | 5.6849 | 5.7554 | 5.8260 | 0.3315 |
| 5.75 | 5.6495 | 5.7193 | 5.7891 | 5.8589 | 0.3223 |
| 5.50 | 5.6848 | 5.7538 | 5.8228 | 5.8919 | 0.3133 |
| 5.25 | 5.7202 | 5.7884 | 5.8567 | 5.9250 | 0.3043 |
| 5.00 | 5.7557 | 5.8232 | 5.8907 | 5.9582 | 0.2956 |
| 4.75 | 5.7914 | 5.8581 | 5.9248 | 5.9915 | 0.2869 |
| 4.50 | 5.8273 | 5.8932 | 5.9591 | 6.0250 | 0.2784 |
| 4.25 | 5.8632 | 5.9283 | 5.9934 | 6.0585 | 0.2700 |
| 4.00 | 5.8993 | 5.9636 | 6.0279 | 6.0921 | 0.2617 |
| 3.75 | 5.9355 | 5.9989 | 6.0624 | 6.1258 | 0.2535 |
| 3.50 | 5.9718 | 6.0344 | 6.0970 | 6.1596 | 0.2455 |
| 3.25 | 6.0082 | 6.0700 | 6.1317 | 6.1935 | 0.2376 |
| 3.00 | 6.0447 | 6.1056 | 6.1665 | 6.2274 | 0.2297 |
| 2.75 | 6.0813 | 6.1413 | 6.2013 | 6.2613 | 0.2220 |
| 2.50 | 6.1179 | 6.1771 | 6.2362 | 6.2954 | 0.2144 |
| 2.25 | 6.1546 | 6.2129 | 6.2712 | 6.3294 | 0.2070 |
| 2.00 | 6.1914 | 6.2488 | 6.3062 | 6.3635 | 0.1996 |
| 1.75 | 6.2283 | 6.2847 | 6.3412 | 6.3977 | 0.1923 |
| 1.50 | 6.2651 | 6.3207 | 6.3763 | 6.4319 | 0.1852 |
| 1.25 | 6.3021 | 6.3567 | 6.4114 | 6.4660 | 0.1781 |
| 1.00 | 6.3389 | 6.3927 | 6.4464 | 6.5001 | 0.1707 |
| 0.75 | 6.3759 | 6.4287 | 6.4815 | 6.5343 | 0.1639 |
| 0.50 | 6.4128 | 6.4647 | 6.5166 | 6.5685 | 0.1572 |
| 0.25 | 6.4498 | 6.5008 | 6.5518 | 6.6027 | 0.1505 |
| 0.00 | 6.4882 | 6.5382 | 6.5882 | 6.6383 | 0.1500 |
| -0.25 | 6.5243 | 6.5734 | 6.6225 | 6.6716 | 0.1400 |
| -0.50 | 6.5627 | 6.6108 | 6.6590 | 6.7071 | 0.1400 |
| -0.75 | 6.6010 | 6.6482 | 6.6954 | 6.7426 | 0.1400 |
| -1.00 | 6.6392 | 6.6855 | 6.7318 | 6.7781 | 0.1400 |
| -1.25 | 6.6774 | 6.7227 | 6.7681 | 6.8134 | 0.1400 |
| -1.50 | 6.7154 | 6.7598 | 6.8042 | 6.8486 | 0.1400 |
| -1.75 | 6.7534 | 6.7969 | 6.8403 | 6.8838 | 0.1400 |
| -2.00 | 6.7912 | 6.8338 | 6.8763 | 6.9188 | 0.1400 |
| -2.25 | 6.8290 | 6.8705 | 6.9121 | 6.9537 | 0.1400 |
| -2.50 | 6.8665 | 6.9072 | 6.9478 | 6.9885 | 0.1400 |

TABLE I-continued

Base curve radius = 8.5 mm; (P₁-P₄) = 1.25 Ds

| N (P₁) | Central zone (R₁) | First Intermediate zone (R₂) | Second Intermediate zone (R₃) | Outer zone (R₄) | C.T. |
|---|---|---|---|---|---|
| -2.75 | 6.9040 | 6.9437 | 6.9834 | 7.0231 | 0.1400 |
| -3.00 | 6.9412 | 6.9800 | 7.0188 | 7.0576 | 0.1400 |
| -3.25 | 6.9783 | 7.0162 | 7.0541 | 7.0920 | 0.1400 |
| -3.50 | 7.0152 | 7.0522 | 7.0892 | 7.1262 | 0.1400 |
| -3.75 | 7.0519 | 7.0880 | 7.1241 | 7.1602 | 0.1400 |
| -4.00 | 7.0884 | 7.1236 | 7.1588 | 7.1940 | 0.1400 |
| -4.25 | 7.1247 | 7.1590 | 7.1933 | 7.2276 | 0.1400 |
| -4.50 | 7.1608 | 7.1942 | 7.2276 | 7.2611 | 0.1400 |
| -4.75 | 7.1966 | 7.2291 | 7.2617 | 7.2943 | 0.1400 |
| -5.00 | 7.2321 | 7.2638 | 7.2955 | 7.3272 | 0.1400 |
| -5.25 | 7.2673 | 7.2982 | 7.3291 | 7.3600 | 0.1400 |
| -5.50 | 7.3023 | 7.3324 | 7.3624 | 7.3925 | 0.1400 |
| -5.75 | 7.3370 | 7.3662 | 7.3955 | 7.4247 | 0.1400 |
| -6.00 | 7.3713 | 7.3998 | 7.4282 | 7.4567 | 0.1400 |
| -6.25 | 7.4053 | 7.4330 | 7.4607 | 7.4884 | 0.1400 |
| -6.50 | 7.4390 | 7.4660 | 7.4929 | 7.5198 | 0.1400 |
| -6.75 | 7.4723 | 7.4985 | 7.5247 | 7.5509 | 0.1400 |
| -7.00 | 7.5053 | 7.5308 | 7.5562 | 7.5817 | 0.1400 |
| -7.25 | 7.5379 | 7.5626 | 7.5874 | 7.6122 | 0.1400 |
| -7.50 | 7.5700 | 7.5941 | 7.6182 | 7.6424 | 0.1400 |
| -7.75 | 7.6018 | 7.6252 | 7.6487 | 7.6722 | 0.1400 |
| -8.00 | 7.6331 | 7.6560 | 7.6788 | 7.7016 | 0.1400 |
| -8.25 | 7.6640 | 7.6862 | 7.7085 | 7.7307 | 0.1400 |
| -8.50 | 7.6945 | 7.7161 | 7.7378 | 7.7594 | 0.1400 |
| -8.75 | 7.7244 | 7.7455 | 7.7666 | 7.7877 | 0.1400 |
| -9.00 | 7.7539 | 7.7745 | 7.7951 | 7.8157 | 0.1400 |
| -9.25 | 7.7829 | 7.8030 | 7.8231 | 7.8432 | 0.1400 |
| -9.50 | 7.8114 | 7.8310 | 7.8507 | 7.8703 | 0.1400 |
| -9.75 | 7.8394 | 7.8586 | 7.8778 | 7.8970 | 0.1400 |
| -10.00 | 7.8668 | 7.8856 | 7.9044 | 7.9232 | 0.1400 |
| -10.25 | 7.8937 | 7.9121 | 7.9306 | 7.9490 | 0.1400 |
| -10.50 | 7.9200 | 7.9381 | 7.9562 | 7.9743 | 0.1400 |
| -10.75 | 7.9457 | 7.9635 | 7.9814 | 7.9992 | 0.1400 |
| -11.00 | 7.9709 | 7.9884 | 8.0060 | 8.0236 | 0.1400 |
| -11.25 | 7.9954 | 8.0128 | 8.0301 | 8.0474 | 0.1400 |
| -11.50 | 8.0194 | 8.0365 | 8.0537 | 8.0708 | 0.1400 |
| -11.75 | 8.0427 | 8.0597 | 8.0767 | 8.0937 | 0.1400 |
| -12.00 | 8.0653 | 8.0822 | 8.0991 | 8.1160 | 0.1400 |
| -12.25 | 8.0873 | 8.1042 | 8.1210 | 8.1378 | 0.1400 |
| -12.50 | 8.1087 | 8.1255 | 8.1423 | 8.1591 | 0.1400 |
| -12.75 | 8.1294 | 8.1462 | 8.1630 | 8.1798 | 0.1400 |
| -13.00 | 8.1494 | 8.1662 | 8.1831 | 8.2000 | 0.1400 |
| -13.25 | 8.1687 | 8.1856 | 8.2026 | 8.2196 | 0.1400 |
| -13.50 | 8.1873 | 8.2044 | 8.2215 | 8.2386 | 0.1400 |
| -13.75 | 8.2051 | 8.2224 | 8.2397 | 8.2570 | 0.1400 |
| -14.00 | 8.2223 | 8.2398 | 8.2573 | 8.2748 | 0.1400 |
| -14.25 | 8.2387 | 8.2565 | 8.2742 | 8.2920 | 0.1400 |
| -14.50 | 8.2543 | 8.2724 | 8.2905 | 8.3086 | 0.1400 |
| -14.75 | 8.2692 | 8.2877 | 8.3062 | 8.3246 | 0.1400 |
| -15.00 | 8.2834 | 8.3022 | 8.3211 | 8.3400 | 0.1400 |
| -15.25 | 8.2967 | 8.3161 | 8.3354 | 8.3547 | 0.1400 |
| -15.50 | 8.3093 | 8.3291 | 8.3490 | 8.3688 | 0.1400 |
| -15.75 | 8.3211 | 8.3415 | 8.3619 | 8.3822 | 0.1400 |
| -16.00 | 8.3321 | 8.3531 | 8.3740 | 8.3950 | 0.1400 |
| -16.25 | 8.3423 | 8.3639 | 8.3855 | 8.4071 | 0.1400 |
| -16.50 | 8.3517 | 8.3740 | 8.3963 | 8.4186 | 0.1400 |
| -16.75 | 8.3603 | 8.3833 | 8.4063 | 8.4293 | 0.1400 |
| -17.00 | 8.3681 | 8.3919 | 8.4156 | 8.4394 | 0.1400 |
| -17.25 | 8.3750 | 8.3996 | 8.4242 | 8.4488 | 0.1400 |
| -17.50 | 8.3812 | 8.4066 | 8.4321 | 8.4576 | 0.1400 |
| -17.75 | 8.3864 | 8.4128 | 8.4392 | 8.4656 | 0.1400 |
| -18.00 | 8.3909 | 8.4182 | 8.4456 | 8.4729 | 0.1400 |
| -18.25 | 8.3945 | 8.4229 | 8.4512 | 8.4796 | 0.1400 |
| -18.50 | 8.3973 | 8.4267 | 8.4561 | 8.4855 | 0.1400 |
| -18.75 | 8.3992 | 8.4297 | 8.4602 | 8.4907 | 0.1400 |
| -19.00 | 8.4003 | 8.4320 | 8.4636 | 8.4952 | 0.1400 |
| -19.25 | 8.4006 | 8.4334 | 8.4662 | 8.4991 | 0.1400 |
| -19.50 | 8.4000 | 8.4341 | 8.4681 | 8.5021 | 0.1400 |
| -19.75 | 8.3986 | 8.4339 | 8.4692 | 8.5045 | 0.1400 |
| -20.00 | 8.3963 | 8.4330 | 8.4696 | 8.5062 | 0.1400 |

TABLE II

Base curve radius = 8.5 mm; (P₁-P₄) = 2.00 Ds

| N (P₁) | Central zone (R₁) | First Intermediate zone (R₂) | Second Intermediate zone (R₃) | Outer zone (R₄) | C.T. |
|---|---|---|---|---|---|
| 20.00 | 3.9844 | 4.0877 | 4.1909 | 4.2942 | 1.1929 |
| 19.75 | 4.0044 | 4.1077 | 4.2110 | 4.3143 | 1.1666 |
| 19.50 | 4.0248 | 4.1281 | 4.2315 | 4.3348 | 1.1411 |
| 19.25 | 4.0455 | 4.1489 | 4.2523 | 4.3557 | 1.1163 |
| 19.00 | 4.0666 | 4.1700 | 4.2735 | 4.3769 | 1.0922 |
| 18.75 | 4.0880 | 4.1915 | 4.2950 | 4.3984 | 1.0688 |
| 18.50 | 4.1098 | 4.2133 | 4.3168 | 4.4203 | 1.0460 |
| 18.25 | 4.1319 | 4.2354 | 4.3389 | 4.4425 | 1.0238 |
| 18.00 | 4.1544 | 4.2579 | 4.3614 | 4.4649 | 1.0022 |
| 17.75 | 4.1771 | 4.2807 | 4.3842 | 4.4877 | 0.9811 |
| 17.50 | 4.2002 | 4.3037 | 4.4073 | 4.5108 | 0.9605 |
| 17.25 | 4.2236 | 4.3271 | 4.4306 | 4.5341 | 0.9403 |
| 17.00 | 4.2473 | 4.3508 | 4.4543 | 4.5578 | 0.9207 |
| 16.75 | 4.2714 | 4.3748 | 4.4783 | 4.5817 | 0.9014 |
| 16.50 | 4.2957 | 4.3991 | 4.5025 | 4.6059 | 0.8826 |
| 16.25 | 4.3203 | 4.4236 | 4.5270 | 4.6304 | 0.8642 |
| 16.00 | 4.3452 | 4.4485 | 4.5518 | 4.6551 | 0.8462 |
| 15.75 | 4.3704 | 4.4736 | 4.5769 | 4.6801 | 0.8285 |
| 15.50 | 4.3958 | 4.4990 | 4.6022 | 4.7054 | 0.8113 |
| 15.25 | 4.4216 | 4.5247 | 4.6278 | 4.7309 | 0.7943 |
| 15.00 | 4.4476 | 4.5506 | 4.6537 | 4.7567 | 0.7777 |
| 14.75 | 4.4739 | 4.5769 | 4.6798 | 4.7827 | 0.7614 |
| 14.50 | 4.5005 | 4.6033 | 4.7062 | 4.8090 | 0.7454 |
| 14.25 | 4.5273 | 4.6301 | 4.7328 | 4.8355 | 0.7297 |
| 14.00 | 4.5545 | 4.6570 | 4.7596 | 4.8622 | 0.7142 |
| 13.75 | 4.5818 | 4.6843 | 4.7868 | 4.8892 | 0.6991 |
| 13.50 | 4.6095 | 4.7118 | 4.8141 | 4.9164 | 0.6842 |
| 13.25 | 4.6374 | 4.7395 | 4.8417 | 4.9439 | 0.6696 |
| 13.00 | 4.6655 | 4.7675 | 4.8695 | 4.9716 | 0.6553 |
| 12.75 | 4.6939 | 4.7958 | 4.8976 | 4.9995 | 0.6411 |
| 12.50 | 4.7226 | 4.8242 | 4.9259 | 5.0276 | 0.6273 |
| 12.25 | 4.7515 | 4.8530 | 4.9544 | 5.0559 | 0.6136 |
| 12.00 | 4.7806 | 4.8819 | 4.9832 | 5.0845 | 0.6002 |
| 11.75 | 4.8100 | 4.9111 | 5.0122 | 5.1133 | 0.5870 |
| 11.50 | 4.8396 | 4.9405 | 5.0414 | 5.1422 | 0.5740 |
| 11.25 | 4.8695 | 4.9701 | 5.0708 | 5.1714 | 0.5613 |
| 11.00 | 4.8996 | 5.0000 | 5.1004 | 5.2008 | 0.5487 |
| 10.75 | 4.9299 | 5.0301 | 5.1302 | 5.2304 | 0.5363 |
| 10.50 | 4.9605 | 5.0604 | 5.1603 | 5.2602 | 0.5241 |
| 10.25 | 4.9912 | 5.0909 | 5.1905 | 5.2902 | 0.5122 |
| 10.00 | 5.0222 | 5.1216 | 5.2210 | 5.3204 | 0.5003 |
| 9.75 | 5.0534 | 5.1525 | 5.2517 | 5.3508 | 0.4887 |
| 9.50 | 5.0849 | 5.1837 | 5.2825 | 5.3813 | 0.4773 |
| 9.25 | 5.1165 | 5.2150 | 5.3135 | 5.4120 | 0.4660 |
| 9.00 | 5.1484 | 5.2466 | 5.3448 | 5.4430 | 0.4549 |
| 8.75 | 5.1804 | 5.2783 | 5.3762 | 5.4741 | 0.4440 |
| 8.50 | 5.2127 | 5.3102 | 5.4078 | 5.5053 | 0.4332 |
| 8.25 | 5.2451 | 5.3423 | 5.4395 | 5.5367 | 0.4226 |
| 8.00 | 5.2778 | 5.3746 | 5.4715 | 5.5683 | 0.4121 |
| 7.75 | 5.3106 | 5.4071 | 5.5036 | 5.6001 | 0.4018 |
| 7.50 | 5.3436 | 5.4397 | 5.5359 | 5.6320 | 0.3917 |
| 7.25 | 5.3768 | 5.4726 | 5.5683 | 5.6641 | 0.3817 |
| 7.00 | 5.4102 | 5.5056 | 5.6009 | 5.6963 | 0.3718 |
| 6.75 | 5.4437 | 5.5387 | 5.6337 | 5.7286 | 0.3621 |
| 6.50 | 5.4774 | 5.5720 | 5.6666 | 5.7611 | 0.3525 |
| 6.25 | 5.5113 | 5.6055 | 5.6996 | 5.7937 | 0.3431 |
| 6.00 | 5.5454 | 5.6391 | 5.7328 | 5.8265 | 0.3338 |
| 5.75 | 5.5795 | 5.6728 | 5.7661 | 5.8594 | 0.3246 |
| 5.50 | 5.6139 | 5.7067 | 5.7995 | 5.8924 | 0.3156 |
| 5.25 | 5.6483 | 5.7407 | 5.8331 | 5.9255 | 0.3067 |
| 5.00 | 5.6829 | 5.7749 | 5.8668 | 5.9587 | 0.2979 |
| 4.75 | 5.7177 | 5.8091 | 5.9006 | 5.9921 | 0.2892 |
| 4.50 | 5.7525 | 5.8435 | 5.9345 | 6.0255 | 0.2807 |
| 4.25 | 5.7875 | 5.8780 | 5.9685 | 6.0590 | 0.2723 |
| 4.00 | 5.8226 | 5.9126 | 6.0026 | 6.0927 | 0.2640 |
| 3.75 | 5.8578 | 5.9473 | 6.0368 | 6.1264 | 0.2558 |
| 3.50 | 5.8931 | 5.9821 | 6.0711 | 6.1601 | 0.2478 |
| 3.25 | 5.9284 | 6.0169 | 6.1055 | 6.1940 | 0.2399 |
| 3.00 | 5.9639 | 6.0519 | 6.1399 | 6.2279 | 0.2320 |
| 2.75 | 5.9994 | 6.0869 | 6.1744 | 6.2619 | 0.2243 |
| 2.50 | 6.0350 | 6.1220 | 6.2089 | 6.2959 | 0.2168 |
| 2.25 | 6.0707 | 6.1571 | 6.2435 | 6.3300 | 0.2093 |

TABLE II-continued

Base curve radius = 8.5 mm; (P$_1$-P$_4$) = 2.00 Ds

| N (P$_1$) | Central zone (R$_1$) | First Intermediate zone (R$_2$) | Second Intermediate zone (R$_3$) | Outer zone (R$_4$) | C.T. |
|---|---|---|---|---|---|
| 2.00 | 6.1064 | 6.1923 | 6.2782 | 6.3641 | 0.2019 |
| 1.75 | 6.1422 | 6.2275 | 6.3129 | 6.3982 | 0.1946 |
| 1.50 | 6.1780 | 6.2628 | 6.3476 | 6.4324 | 0.1875 |
| 1.25 | 6.2138 | 6.2981 | 6.3823 | 6.4666 | 0.1804 |
| 1.00 | 6.2496 | 6.3333 | 6.4170 | 6.5007 | 0.1730 |
| 0.75 | 6.2855 | 6.3686 | 6.4517 | 6.5349 | 0.1662 |
| 0.50 | 6.3213 | 6.4039 | 6.4865 | 6.5691 | 0.1595 |
| 0.25 | 6.3572 | 6.4392 | 6.5212 | 6.6032 | 0.1528 |
| 0.00 | 6.3939 | 6.4754 | 6.5568 | 6.6383 | 0.1500 |
| −0.25 | 6.4290 | 6.5099 | 6.5908 | 6.6716 | 0.1403 |
| −0.50 | 6.4662 | 6.5465 | 6.6268 | 6.7071 | 0.1400 |
| −0.75 | 6.5034 | 6.5831 | 6.6629 | 6.7426 | 0.1400 |
| −1.00 | 6.5405 | 6.6197 | 6.6989 | 6.7781 | 0.1400 |
| −1.25 | 6.5775 | 6.6561 | 6.7348 | 6.8134 | 0.1400 |
| −1.50 | 6.6144 | 6.6925 | 6.7706 | 6.8486 | 0.1400 |
| −1.75 | 6.6512 | 6.7287 | 6.8063 | 6.8838 | 0.1400 |
| −2.00 | 6.6879 | 6.7649 | 6.8418 | 6.9188 | 0.1400 |
| −2.25 | 6.7245 | 6.8009 | 6.8773 | 6.9537 | 0.1400 |
| −2.50 | 6.7609 | 6.8368 | 6.9126 | 6.9885 | 0.1400 |
| −2.75 | 6.7972 | 6.8725 | 6.9478 | 7.0231 | 0.1400 |
| −3.00 | 6.8333 | 6.9081 | 6.9829 | 7.0576 | 0.1400 |
| −3.25 | 6.8693 | 6.9435 | 7.0178 | 7.0920 | 0.1400 |
| −3.50 | 6.9050 | 6.9787 | 7.0525 | 7.1262 | 0.1400 |
| −3.75 | 6.9406 | 7.0138 | 7.0870 | 7.1602 | 0.1400 |
| −4.00 | 6.9759 | 7.0486 | 7.1213 | 7.1940 | 0.1400 |
| −4.25 | 7.0110 | 7.0832 | 7.1554 | 7.2276 | 0.1400 |
| −4.50 | 7.0459 | 7.1176 | 7.1893 | 7.2611 | 0.1400 |
| −4.75 | 7.0806 | 7.1518 | 7.2230 | 7.2943 | 0.1400 |
| −5.00 | 7.1150 | 7.1857 | 7.2565 | 7.3272 | 0.1400 |
| −5.25 | 7.1491 | 7.2194 | 7.2897 | 7.3600 | 0.1400 |
| −5.50 | 7.1829 | 7.2528 | 7.3226 | 7.3925 | 0.1400 |
| −5.75 | 7.2164 | 7.2859 | 7.3553 | 7.4247 | 0.1400 |
| −6.00 | 7.2497 | 7.3187 | 7.3877 | 7.4567 | 0.1400 |
| −6.25 | 7.2826 | 7.3512 | 7.4198 | 7.4884 | 0.1400 |
| −6.50 | 7.3151 | 7.3834 | 7.4516 | 7.5198 | 0.1400 |
| −6.75 | 7.3473 | 7.4152 | 7.4831 | 7.5509 | 0.1400 |
| −7.00 | 7.3792 | 7.4467 | 7.5142 | 7.5817 | 0.1400 |
| −7.25 | 7.4107 | 7.4779 | 7.5450 | 7.6122 | 0.1400 |
| −7.50 | 7.4418 | 7.5086 | 7.5755 | 7.6424 | 0.1400 |
| −7.75 | 7.4724 | 7.5390 | 7.6056 | 7.6722 | 0.1400 |
| −8.00 | 7.5027 | 7.5690 | 7.6353 | 7.7016 | 0.1400 |
| −8.25 | 7.5326 | 7.5986 | 7.6647 | 7.7307 | 0.1400 |
| −8.50 | 7.5620 | 7.6278 | 7.6936 | 7.7594 | 0.1400 |
| −8.75 | 7.5909 | 7.6565 | 7.7221 | 7.7877 | 0.1400 |
| −9.00 | 7.6194 | 7.6848 | 7.7502 | 7.8157 | 0.1400 |
| −9.25 | 7.6474 | 7.7126 | 7.7779 | 7.8432 | 0.1400 |
| −9.50 | 7.6749 | 7.7400 | 7.8052 | 7.8703 | 0.1400 |
| −9.75 | 7.7018 | 7.7669 | 7.8319 | 7.8970 | 0.1400 |
| −10.00 | 7.7283 | 7.7933 | 7.8583 | 7.9232 | 0.1400 |
| −10.25 | 7.7542 | 7.8192 | 7.8841 | 7.9490 | 0.1400 |
| −10.50 | 7.7796 | 7.8445 | 7.9094 | 7.9743 | 0.1400 |
| −10.75 | 7.8045 | 7.8694 | 7.9343 | 7.9992 | 0.1400 |
| −11.00 | 7.8287 | 7.8937 | 7.9586 | 8.0236 | 0.1400 |
| −11.25 | 7.8524 | 7.9174 | 7.9824 | 8.0474 | 0.1400 |
| −11.50 | 7.8755 | 7.9406 | 8.0057 | 8.0708 | 0.1400 |
| −11.75 | 7.8980 | 7.9632 | 8.0284 | 8.0937 | 0.1400 |
| −12.00 | 7.9198 | 7.9852 | 8.0506 | 8.1160 | 0.1400 |
| −12.25 | 7.9410 | 8.0066 | 8.0722 | 8.1378 | 0.1400 |
| −12.50 | 7.9616 | 8.0274 | 8.0933 | 8.1591 | 0.1400 |
| −12.75 | 7.9816 | 8.0476 | 8.1137 | 8.1798 | 0.1400 |
| −13.00 | 8.0008 | 8.0672 | 8.1336 | 8.2000 | 0.1400 |
| −13.25 | 8.0194 | 8.0861 | 8.1528 | 8.2196 | 0.1400 |
| −13.50 | 8.0373 | 8.1044 | 8.1715 | 8.2386 | 0.1400 |
| −13.75 | 8.0545 | 8.1220 | 8.1895 | 8.2570 | 0.1400 |
| −14.00 | 8.0711 | 8.1390 | 8.2069 | 8.2748 | 0.1400 |
| −14.25 | 8.0869 | 8.1553 | 8.2236 | 8.2920 | 0.1400 |
| −14.50 | 8.1020 | 8.1708 | 8.2397 | 8.3086 | 0.1400 |
| −14.75 | 8.1163 | 8.1857 | 8.2552 | 8.3246 | 0.1400 |
| −15.00 | 8.1299 | 8.1999 | 8.2700 | 8.3400 | 0.1400 |
| −15.25 | 8.1428 | 8.2134 | 8.2841 | 8.3547 | 0.1400 |
| −15.50 | 8.1549 | 8.2262 | 8.2975 | 8.3688 | 0.1400 |
| −15.75 | 8.1663 | 8.2383 | 8.3102 | 8.3822 | 0.1400 |
| −16.00 | 8.1769 | 8.2496 | 8.3223 | 8.3950 | 0.1400 |
| −16.25 | 8.1867 | 8.2602 | 8.3336 | 8.4071 | 0.1400 |
| −16.50 | 8.1958 | 8.2700 | 8.3443 | 8.4186 | 0.1400 |
| −16.75 | 8.2040 | 8.2791 | 8.3542 | 8.4293 | 0.1400 |
| −17.00 | 8.2115 | 8.2875 | 8.3635 | 8.4394 | 0.1400 |
| −17.25 | 8.2182 | 8.2951 | 8.3720 | 8.4488 | 0.1400 |
| −17.50 | 8.2241 | 8.3019 | 8.3797 | 8.4576 | 0.1400 |
| −17.75 | 8.2292 | 8.3080 | 8.3868 | 8.4656 | 0.1400 |
| −18.00 | 8.2335 | 8.3133 | 8.3931 | 8.4729 | 0.1400 |
| −18.25 | 8.2369 | 8.3178 | 8.3987 | 8.4796 | 0.1400 |
| −18.50 | 8.2396 | 8.3216 | 8.4035 | 8.4855 | 0.1400 |
| −18.75 | 8.9415 | 8.3246 | 8.4077 | 8.4907 | 0.1400 |
| −19.00 | 8.2426 | 8.3268 | 8.4110 | 8.4952 | 0.1400 |
| −19.25 | 8.2428 | 8.3282 | 8.4136 | 8.4991 | 0.1400 |
| −19.50 | 8.2422 | 8.3289 | 8.4155 | 8.5021 | 0.1400 |
| −19.75 | 8.2409 | 8.3288 | 8.4166 | 8.5045 | 0.1400 |
| −20.00 | 8.2387 | 8.3279 | 8.4170 | 8.5062 | 0.1400 |

TABLE III

Base curve radius = 8.732 mm; (P$_1$-P$_4$) = 1.25 Ds

| N (P$_1$) | Central zone (R$_1$) | First Intermediate zone (R$_2$) | Second Intermediate zone (R$_3$) | Outer zone (R$_4$) | C.T. |
|---|---|---|---|---|---|
| 20.00 | 4.0652 | 4.1608 | 4.2563 | 4.3519 | 1.1583 |
| 19.75 | 4.0868 | 4.1823 | 4.2778 | 4.3733 | 1.1335 |
| 19.50 | 4.1088 | 4.2042 | 4.2996 | 4.3950 | 1.1094 |
| 19.25 | 4.1311 | 4.2264 | 4.3217 | 4.4171 | 1.0860 |
| 19.00 | 4.1538 | 4.2490 | 4.3442 | 4.4394 | 1.0631 |
| 18.75 | 4.1768 | 4.2719 | 4.3670 | 4.4622 | 1.0409 |
| 18.50 | 4.2002 | 4.2952 | 4.3902 | 4.4852 | 1.0192 |
| 18.25 | 4.2240 | 4.3188 | 4.4137 | 4.5085 | 0.9981 |
| 18.00 | 4.2481 | 4.3428 | 4.4375 | 4.5322 | 0.9774 |
| 17.75 | 4.2725 | 4.3670 | 4.4616 | 4.5561 | 0.9572 |
| 17.50 | 4.2972 | 4.3916 | 4.4860 | 4.5804 | 0.9375 |
| 17.25 | 4.3223 | 4.4165 | 4.5107 | 4.6049 | 0.9182 |
| 17.00 | 4.3476 | 4.4417 | 4.5357 | 4.6298 | 0.8993 |
| 16.75 | 4.3733 | 4.4672 | 4.5610 | 4.6549 | 0.8809 |
| 16.50 | 4.3994 | 4.4930 | 4.5866 | 4.6803 | 0.8628 |
| 16.25 | 4.4257 | 4.5191 | 4.6125 | 4.7060 | 0.8451 |
| 16.00 | 4.4523 | 4.5455 | 4.6387 | 4.7319 | 0.8277 |
| 15.75 | 4.4792 | 4.5722 | 4.6652 | 4.7581 | 0.8107 |
| 15.50 | 4.5065 | 4.5992 | 4.6919 | 4.7846 | 0.7940 |
| 15.25 | 4.5340 | 4.6265 | 4.7189 | 4.8114 | 0.7776 |
| 15.00 | 4.5618 | 4.6540 | 4.7462 | 4.8384 | 0.7615 |
| 14.75 | 4.5899 | 4.6818 | 4.7737 | 4.8657 | 0.7458 |
| 14.50 | 4.6183 | 4.7100 | 4.8016 | 4.8932 | 0.7303 |
| 14.25 | 4.6470 | 4.7383 | 4.8296 | 4.9209 | 0.7151 |
| 14.00 | 4.6760 | 4.7670 | 4.8580 | 4.9490 | 0.7001 |
| 13.75 | 4.7053 | 4.7959 | 4.8866 | 4.9772 | 0.6854 |
| 13.50 | 4.7348 | 4.8251 | 4.9155 | 5.0058 | 0.6710 |
| 13.25 | 4.7647 | 4.8546 | 4.9446 | 5.0345 | 0.6568 |
| 13.00 | 4.7948 | 4.8843 | 4.9739 | 5.0635 | 0.6429 |
| 12.75 | 4.8251 | 4.9143 | 5.0035 | 5.0927 | 0.6291 |
| 12.50 | 4.8558 | 4.9446 | 5.0334 | 5.1222 | 0.6156 |
| 12.25 | 4.8867 | 4.9751 | 5.0635 | 5.1519 | 0.6024 |
| 12.00 | 4.9179 | 5.0059 | 5.0939 | 5.1818 | 0.5893 |
| 11.75 | 4.9494 | 5.0369 | 5.1244 | 5.2120 | 0.5765 |
| 11.50 | 4.9811 | 5.0682 | 5.1553 | 5.2424 | 0.5638 |
| 11.25 | 5.0131 | 5.0997 | 5.1863 | 5.2730 | 0.5513 |
| 11.00 | 5.0453 | 5.1315 | 5.2176 | 5.3038 | 0.5391 |
| 10.75 | 5.0778 | 5.1635 | 5.2491 | 5.3348 | 0.5270 |
| 10.50 | 5.1105 | 5.1957 | 5.2809 | 5.3660 | 0.5151 |
| 10.25 | 5.1435 | 5.2282 | 5.3128 | 5.3975 | 0.5034 |
| 10.00 | 5.1768 | 5.2609 | 5.3450 | 5.4291 | 0.4919 |
| 9.75 | 5.2102 | 5.2938 | 5.3774 | 5.4610 | 0.4805 |

TABLE III-continued

Base curve radius = 8.732 mm; $(P_1-P_4)$ = 1.25 Ds

| N ($P_1$) | Central zone ($R_1$) | First Intermediate zone ($R_2$) | Second Intermediate zone ($R_3$) | Outer zone ($R_4$) | C.T. |
|---|---|---|---|---|---|
| 9.50 | 5.2440 | 5.3270 | 5.4100 | 5.4931 | 0.4693 |
| 9.25 | 5.2779 | 5.3604 | 5.4428 | 5.5253 | 0.4583 |
| 9.00 | 5.3121 | 5.3940 | 5.4759 | 5.5577 | 0.4474 |
| 8.75 | 5.3465 | 5.4278 | 5.5091 | 5.5904 | 0.4367 |
| 8.50 | 5.3812 | 5.4618 | 5.5425 | 5.6232 | 0.4262 |
| 8.25 | 5.4160 | 5.4961 | 5.5761 | 5.6562 | 0.4158 |
| 8.00 | 5.4511 | 5.5305 | 5.6100 | 5.6894 | 0.4056 |
| 7.75 | 5.4864 | 5.5652 | 5.6440 | 5.7227 | 0.3955 |
| 7.50 | 5.5220 | 5.6001 | 5.6781 | 5.7562 | 0.3855 |
| 7.25 | 5.5577 | 5.6351 | 5.7125 | 5.7899 | 0.3757 |
| 7.00 | 5.5936 | 5.6703 | 5.7471 | 5.8238 | 0.3660 |
| 6.75 | 5.6297 | 5.7057 | 5.7818 | 5.8578 | 0.3565 |
| 6.50 | 5.6660 | 5.7413 | 5.8167 | 5.8920 | 0.3471 |
| 6.25 | 5.7025 | 5.7771 | 5.8517 | 5.9263 | 0.3379 |
| 6.00 | 5.7392 | 5.8131 | 5.8869 | 5.9607 | 0.3287 |
| 5.75 | 5.7761 | 5.8492 | 5.9222 | 5.9953 | 0.3197 |
| 5.50 | 5.8131 | 5.8854 | 5.9577 | 6.0300 | 0.3108 |
| 5.25 | 5.8503 | 5.9219 | 5.9934 | 6.0649 | 0.3021 |
| 5.00 | 5.8877 | 5.9584 | 6.0292 | 6.0999 | 0.2935 |
| 4.75 | 5.9252 | 5.9951 | 6.0651 | 6.1350 | 0.2850 |
| 4.50 | 5.9629 | 6.0320 | 6.1011 | 6.1702 | 0.2766 |
| 4.25 | 6.0007 | 6.0690 | 6.1372 | 6.2055 | 0.2683 |
| 4.00 | 6.0386 | 6.1061 | 6.1735 | 6.2409 | 0.2602 |
| 3.75 | 6.0767 | 6.1433 | 6.2099 | 6.2765 | 0.2522 |
| 3.50 | 6.1149 | 6.1806 | 6.2463 | 6.3121 | 0.2442 |
| 3.25 | 6.1532 | 6.2181 | 6.2829 | 6.3478 | 0.2364 |
| 3.00 | 6.1916 | 6.2556 | 6.3196 | 6.3835 | 0.2287 |
| 2.75 | 6.2302 | 6.2932 | 6.3563 | 6.4194 | 0.2212 |
| 2.50 | 6.2688 | 6.3309 | 6.3931 | 6.4553 | 0.2137 |
| 2.25 | 6.3075 | 6.3687 | 6.4300 | 6.4912 | 0.2063 |
| 2.00 | 6.3462 | 6.4066 | 6.4669 | 6.5272 | 0.1991 |
| 1.75 | 6.3851 | 6.4445 | 6.5039 | 6.5633 | 0.1919 |
| 1.50 | 6.4239 | 6.4824 | 6.5409 | 6.5994 | 0.1849 |
| 1.25 | 6.4629 | 6.5204 | 6.5780 | 6.6355 | 0.1779 |
| 1.00 | 6.5018 | 6.5584 | 6.6150 | 6.6716 | 0.1706 |
| 0.75 | 6.5408 | 6.5964 | 6.6521 | 6.7077 | 0.1639 |
| 0.50 | 6.5798 | 6.6345 | 6.6892 | 6.7439 | 0.1573 |
| 0.25 | 6.6189 | 6.6726 | 6.7263 | 6.7800 | 0.1507 |
| 0.00 | 6.6592 | 6.7120 | 6.7647 | 6.8175 | 0.1500 |
| -0.25 | 6.6974 | 6.7492 | 6.8010 | 6.8528 | 0.1400 |
| -0.50 | 6.7379 | 6.7887 | 6.8395 | 6.8903 | 0.1400 |
| -0.75 | 6.7783 | 6.8281 | 6.8779 | 6.9278 | 0.1400 |
| -1.00 | 6.8186 | 6.8675 | 6.9163 | 6.9652 | 0.1400 |
| -1.25 | 6.8589 | 6.9068 | 6.9546 | 7.0025 | 0.1400 |
| -1.50 | 6.8991 | 6.9460 | 6.9928 | 7.0397 | 0.1400 |
| -1.75 | 6.9391 | 6.9851 | 7.0310 | 7.0769 | 0.1400 |
| -2.00 | 6.9791 | 7.0240 | 7.0690 | 7.1139 | 0.1400 |
| -2.25 | 7.0190 | 7.0629 | 7.1069 | 7.1508 | 0.1400 |
| -2.50 | 7.0587 | 7.1017 | 7.1447 | 7.1876 | 0.1400 |
| -2.75 | 7.0982 | 7.1403 | 7.1823 | 7.2243 | 0.1400 |
| -3.00 | 7.1377 | 7.1787 | 7.2198 | 7.2608 | 0.1400 |
| -3.25 | 7.1769 | 7.2170 | 7.2571 | 7.2972 | 0.1400 |
| -3.50 | 7.2159 | 7.2551 | 7.2942 | 7.3334 | 0.1400 |
| -3.75 | 7.2548 | 7.2930 | 7.3312 | 7.3694 | 0.1400 |
| -4.00 | 7.2934 | 7.3307 | 7.3680 | 7.4053 | 0.1400 |
| -4.25 | 7.3319 | 7.3682 | 7.4046 | 7.4409 | 0.1400 |
| -4.50 | 7.3700 | 7.4055 | 7.4409 | 7.4764 | 0.1400 |
| -4.75 | 7.4080 | 7.4425 | 7.4770 | 7.5116 | 0.1400 |
| -5.00 | 7.4456 | 7.4793 | 7.5129 | 7.5466 | 0.1400 |
| -5.25 | 7.4830 | 7.5158 | 7.5485 | 7.5813 | 0.1400 |
| -5.50 | 7.5201 | 7.5520 | 7.5839 | 7.6158 | 0.1400 |
| -5.75 | 7.5569 | 7.5879 | 7.6190 | 7.6500 | 0.1400 |
| -6.00 | 7.5933 | 7.6236 | 7.6538 | 7.6840 | 0.1400 |
| -6.25 | 7.6295 | 7.6589 | 7.6883 | 7.7177 | 0.1400 |
| -6.50 | 7.6652 | 7.6938 | 7.7224 | 7.7510 | 0.1400 |
| -6.75 | 7.7006 | 7.7284 | 7.7563 | 7.7841 | 0.1400 |
| -7.00 | 7.7356 | 7.7627 | 7.7898 | 7.8169 | 0.1400 |
| -7.25 | 7.7702 | 7.7966 | 7.8229 | 7.8493 | 0.1400 |
| -7.50 | 7.8044 | 7.8301 | 7.8557 | 7.8813 | 0.1400 |
| -7.75 | 7.8382 | 7.8632 | 7.8881 | 7.9131 | 0.1400 |
| -8.00 | 7.8715 | 7.8958 | 7.9201 | 7.9444 | 0.1400 |
| -8.25 | 7.9044 | 7.9280 | 7.9517 | 7.9754 | 0.1400 |
| -8.50 | 7.9368 | 7.9598 | 7.9829 | 8.0059 | 0.1400 |
| -8.75 | 7.9687 | 7.9912 | 8.0136 | 8.0361 | 0.1400 |
| -9.00 | 8.0001 | 8.0220 | 8.0439 | 8.0659 | 0.1400 |
| -9.25 | 8.0310 | 8.0524 | 8.0738 | 8.0952 | 0.1400 |
| -9.50 | 8.0613 | 8.0822 | 8.1031 | 8.1241 | 0.1400 |
| -9.75 | 8.0911 | 8.1116 | 8.1320 | 8.1525 | 0.1400 |
| -10.00 | 8.1203 | 8.1404 | 8.1604 | 8.1805 | 0.1400 |
| -10.25 | 8.1490 | 8.1686 | 8.1883 | 8.2080 | 0.1400 |
| -10.50 | 8.1770 | 8.1963 | 8.2157 | 8.2350 | 0.1400 |
| -10.75 | 8.2045 | 8.2235 | 8.2425 | 8.2615 | 0.1400 |
| -11.00 | 8.2313 | 8.2500 | 8.2688 | 8.2875 | 0.1400 |
| -11.25 | 8.2575 | 8.2760 | 8.2945 | 8.3130 | 0.1400 |
| -11.50 | 8.2830 | 8.3013 | 8.3196 | 8.3379 | 0.1400 |
| -11.75 | 8.3079 | 8.3260 | 8.3442 | 8.3624 | 0.1400 |
| -12.00 | 8.3321 | 8.3501 | 8.3682 | 8.3862 | 0.1400 |
| -12.25 | 8.3556 | 8.3736 | 8.3915 | 8.4095 | 0.1400 |
| -12.50 | 8.3784 | 8.3963 | 8.4143 | 8.4322 | 0.1400 |
| -12.75 | 8.4005 | 8.4184 | 8.4364 | 8.4544 | 0.1400 |
| -13.00 | 8.4218 | 8.4399 | 8.4579 | 8.4759 | 0.1400 |
| -13.25 | 8.4425 | 8.4606 | 8.4787 | 8.4968 | 0.1400 |
| -13.50 | 8.4623 | 8.4806 | 8.4989 | 8.5171 | 0.1400 |
| -13.75 | 8.4814 | 8.4999 | 8.5184 | 8.5368 | 0.1400 |
| -14.00 | 8.4997 | 8.5185 | 8.5372 | 8.5559 | 0.1400 |
| -14.25 | 8.5173 | 8.5363 | 8.5553 | 8.5743 | 0.1400 |
| -14.50 | 8.5340 | 8.5534 | 8.5727 | 8.5921 | 0.1400 |
| -14.75 | 8.5500 | 8.5697 | 8.5894 | 8.6092 | 0.1400 |
| -15.00 | 8.5651 | 8.5852 | 8.6054 | 8.6256 | 0.1400 |
| -15.25 | 8.5794 | 8.6000 | 8.6207 | 8.6414 | 0.1400 |
| -15.50 | 8.5928 | 8.6140 | 8.6352 | 8.6564 | 0.1400 |
| -15.75 | 8.6055 | 8.6272 | 8.6490 | 8.6708 | 0.1400 |
| -16.00 | 8.6172 | 8.6396 | 8.6621 | 8.6845 | 0.1400 |
| -16.25 | 8.6281 | 8.6512 | 8.6744 | 8.6975 | 0.1400 |
| -16.50 | 8.6382 | 8.6620 | 8.6859 | 8.7097 | 0.1400 |
| -16.75 | 8.6474 | 8.6720 | 8.6966 | 8.7212 | 0.1400 |
| -17.00 | 8.6557 | 8.6812 | 8.7066 | 8.7321 | 0.1400 |
| -17.25 | 8.6631 | 8.6895 | 8.7158 | 8.7421 | 0.1400 |
| -17.50 | 8.6697 | 8.6969 | 8.7242 | 8.7515 | 0.1400 |
| -17.75 | 8.6753 | 8.7036 | 8.7318 | 8.7601 | 0.1400 |
| -18.00 | 8.6801 | 8.7094 | 8.7387 | 8.7679 | 0.1400 |
| -18.25 | 8.6840 | 8.7143 | 8.7447 | 8.7751 | 0.1400 |
| -18.50 | 8.6870 | 8.7184 | 8.7499 | 8.7814 | 0.1400 |
| -18.75 | 8.6890 | 8.7217 | 8.7544 | 8.7870 | 0.1400 |
| -19.00 | 8.6902 | 8.7241 | 8.7580 | 8.7918 | 0.1400 |
| -19.25 | 8.6905 | 8.7256 | 8.7608 | 8.7959 | 0.1400 |
| -19.50 | 8.6899 | 8.7263 | 8.7628 | 8.7992 | 0.1400 |
| -19.75 | 8.6884 | 8.7262 | 8.7640 | 8.8018 | 0.1400 |
| -20.00 | 8.6859 | 8.7251 | 8.7644 | 8.8036 | 0.1400 |

TABLE IV

Base curve radius = 8.732 mm; $(P_1-P_4)$ = 2.00 Ds

| N ($P_1$) | Central zone ($R_1$) | First Intermediate zone ($R_2$) | Second Intermediate zone ($R_3$) | Outer zone ($R_4$) | C.T. |
|---|---|---|---|---|---|
| 20.00 | 4.0329 | 4.1394 | 4.2460 | 4.3525 | 1.1608 |
| 19.75 | 4.0540 | 4.1606 | 4.2672 | 4.3738 | 1.1359 |
| 19.50 | 4.0755 | 4.1822 | 4.2889 | 4.3956 | 1.1118 |
| 19.25 | 4.0974 | 4.2041 | 4.3109 | 4.4176 | 1.0884 |
| 19.00 | 4.1196 | 4.2264 | 4.3332 | 4.4400 | 1.0656 |
| 18.75 | 4.1421 | 4.2490 | 4.3558 | 4.4627 | 1.0433 |
| 18.50 | 4.1650 | 4.2719 | 4.3788 | 4.4857 | 1.0216 |
| 18.25 | 4.1882 | 4.2952 | 4.4021 | 4.5091 | 1.0005 |
| 18.00 | 4.2118 | 4.3188 | 4.4258 | 4.5327 | 0.9798 |
| 17.75 | 4.2357 | 4.3427 | 4.4497 | 4.5567 | 0.9596 |
| 17.50 | 4.2599 | 4.3669 | 4.4739 | 4.5809 | 0.9399 |
| 17.25 | 4.2844 | 4.3914 | 4.4985 | 4.6055 | 0.9206 |

TABLE IV-continued

Base curve radius = 8.732 mm; $(P_1-P_4)$ = 2.00 Ds

| N ($P_1$) | Central zone ($R_1$) | First Intermediate zone ($R_2$) | Second Intermediate zone ($R_3$) | Outer zone ($R_4$) | C.T. |
|---|---|---|---|---|---|
| 17.00 | 4.3092 | 4.4162 | 4.5233 | 4.6303 | 0.9017 |
| 16.75 | 4.3343 | 4.4414 | 4.5484 | 4.6554 | 0.8833 |
| 16.50 | 4.3598 | 4.4668 | 4.5738 | 4.6808 | 0.8652 |
| 16.25 | 4.3855 | 4.4925 | 4.5995 | 4.7065 | 0.8475 |
| 16.00 | 4.4115 | 4.5185 | 4.6255 | 4.7325 | 0.8301 |
| 15.75 | 4.4379 | 4.5448 | 4.6517 | 4.7587 | 0.8131 |
| 15.50 | 4.4645 | 4.5714 | 4.6783 | 4.7852 | 0.7964 |
| 15.25 | 4.4914 | 4.5982 | 4.7051 | 4.8119 | 0.7800 |
| 15.00 | 4.5186 | 4.6254 | 4.7322 | 4.8389 | 0.7639 |
| 14.75 | 4.5461 | 4.6528 | 4.7595 | 4.8662 | 0.7481 |
| 14.50 | 4.5739 | 4.6805 | 4.7871 | 4.8937 | 0.7326 |
| 14.25 | 4.6019 | 4.7084 | 4.8150 | 4.9215 | 0.7174 |
| 14.00 | 4.6302 | 4.7367 | 4.8431 | 4.9495 | 0.7025 |
| 13.75 | 4.6588 | 4.7651 | 4.8715 | 4.9778 | 0.6878 |
| 13.50 | 4.6877 | 4.7939 | 4.9001 | 5.0063 | 0.6734 |
| 13.25 | 4.7168 | 4.8229 | 4.9290 | 5.0351 | 0.6592 |
| 13.00 | 4.7462 | 4.8522 | 4.9581 | 5.0641 | 0.6452 |
| 12.75 | 4.7759 | 4.8817 | 4.9875 | 5.0933 | 0.6315 |
| 12.50 | 4.8058 | 4.9115 | 5.0171 | 5.1228 | 0.6180 |
| 12.25 | 4.8360 | 4.9415 | 5.0470 | 5.1525 | 0.6047 |
| 12.00 | 4.8665 | 4.9718 | 5.0771 | 5.1824 | 0.5916 |
| 11.75 | 4.8972 | 5.0023 | 5.1074 | 5.2125 | 0.5788 |
| 11.50 | 4.9282 | 5.0331 | 5.1380 | 5.2429 | 0.5661 |
| 11.25 | 4.9594 | 5.0641 | 5.1688 | 5.2735 | 0.5537 |
| 11.00 | 4.9908 | 5.0953 | 5.1998 | 5.3043 | 0.5414 |
| 10.75 | 5.0225 | 5.1268 | 5.2311 | 5.3353 | 0.5293 |
| 10.50 | 5.0545 | 5.1585 | 5.2625 | 5.3666 | 0.5175 |
| 10.25 | 5.0867 | 5.1904 | 5.2942 | 5.3980 | 0.5057 |
| 10.00 | 5.1191 | 5.2226 | 5.3261 | 5.4297 | 0.4942 |
| 9.75 | 5.1517 | 5.2550 | 5.3583 | 5.4615 | 0.4829 |
| 9.50 | 5.1846 | 5.2876 | 5.3906 | 5.4936 | 0.4717 |
| 9.25 | 5.2177 | 5.3204 | 5.4231 | 5.5258 | 0.4606 |
| 9.00 | 5.2511 | 5.3535 | 5.4559 | 5.5583 | 0.4498 |
| 8.75 | 5.2846 | 5.3867 | 5.4888 | 5.5909 | 0.4391 |
| 8.50 | 5.3184 | 5.4202 | 5.5219 | 5.6237 | 0.4285 |
| 8.25 | 5.3524 | 5.4538 | 5.5553 | 5.6567 | 0.4181 |
| 8.00 | 5.3865 | 5.4877 | 5.5888 | 5.6899 | 0.4079 |
| 7.75 | 5.4209 | 5.5217 | 5.6225 | 5.7233 | 0.3978 |
| 7.50 | 5.4555 | 5.5559 | 5.6564 | 5.7568 | 0.3878 |
| 7.25 | 5.4903 | 5.5904 | 5.6904 | 5.7905 | 0.3780 |
| 7.00 | 5.5253 | 5.6250 | 5.7246 | 5.8243 | 0.3684 |
| 6.75 | 5.5605 | 5.6598 | 5.7590 | 5.8583 | 0.3588 |
| 6.50 | 5.5958 | 5.6947 | 5.7936 | 5.8925 | 0.3494 |
| 6.25 | 5.6313 | 5.7298 | 5.8283 | 5.9268 | 0.3402 |
| 6.00 | 5.6670 | 5.7651 | 5.8632 | 5.9613 | 0.3310 |
| 5.75 | 5.7029 | 5.8006 | 5.8982 | 5.9958 | 0.3220 |
| 5.50 | 5.7389 | 5.8362 | 5.9334 | 6.0306 | 0.3132 |
| 5.25 | 5.7751 | 5.8719 | 5.9687 | 6.0654 | 0.3044 |
| 5.00 | 5.8115 | 5.9078 | 6.0041 | 6.1004 | 0.2958 |
| 4.75 | 5.8479 | 5.9438 | 6.0397 | 6.1355 | 0.2873 |
| 4.50 | 5.8846 | 5.9799 | 6.0753 | 6.1707 | 0.2789 |
| 4.25 | 5.9213 | 6.0162 | 6.1111 | 6.2060 | 0.2706 |
| 4.00 | 5.9582 | 6.0526 | 6.1470 | 6.2415 | 0.2625 |
| 3.75 | 5.9952 | 6.0891 | 6.1831 | 6.2770 | 0.2545 |
| 3.50 | 6.0323 | 6.1257 | 6.2192 | 6.3126 | 0.2465 |
| 3.25 | 6.0695 | 6.1624 | 6.2554 | 6.3483 | 0.2387 |
| 3.00 | 6.1068 | 6.1992 | 6.2916 | 6.3841 | 0.2310 |
| 2.75 | 6.1442 | 6.2361 | 6.3280 | 6.4199 | 0.2235 |
| 2.50 | 6.1817 | 6.2731 | 6.3644 | 6.4558 | 0.2160 |
| 2.25 | 6.2193 | 6.3101 | 6.4009 | 6.4918 | 0.2086 |
| 2.00 | 6.2569 | 6.3472 | 6.4375 | 6.5278 | 0.2014 |
| 1.75 | 6.2946 | 6.3843 | 6.4741 | 6.5638 | 0.1942 |
| 1.50 | 6.3323 | 6.4215 | 6.5107 | 6.5999 | 0.1872 |
| 1.25 | 6.3701 | 6.4587 | 6.5474 | 6.6360 | 0.1802 |
| 1.00 | 6.4078 | 6.4959 | 6.5840 | 6.6721 | 0.1729 |
| 0.75 | 6.4456 | 6.5332 | 6.6207 | 6.7082 | 0.1662 |
| 0.50 | 6.4835 | 6.5704 | 6.6574 | 6.7444 | 0.1596 |
| 0.25 | 6.5213 | 6.6077 | 6.6941 | 6.7806 | 0.1530 |
| 0.00 | 6.5599 | 6.6458 | 6.7316 | 6.8175 | 0.1500 |
| −0.25 | 6.5971 | 6.6824 | 6.7676 | 6.8529 | 0.1406 |
| −0.50 | 6.6362 | 6.7209 | 6.8056 | 6.8903 | 0.1400 |
| −0.75 | 6.6754 | 6.7595 | 6.8436 | 6.9278 | 0.1400 |
| −1.00 | 6.7145 | 6.7980 | 6.8816 | 6.9652 | 0.1400 |
| −1.25 | 6.7535 | 6.8365 | 6.9195 | 7.0025 | 0.1400 |
| −1.50 | 6.7924 | 6.8749 | 6.9573 | 7.0397 | 0.1400 |
| −1.75 | 6.8313 | 6.9132 | 6.9950 | 7.0769 | 0.1400 |
| −2.00 | 6.8700 | 6.9513 | 7.0326 | 7.1139 | 0.1400 |
| −2.25 | 6.9086 | 6.9894 | 7.0701 | 7.1508 | 0.1400 |
| −2.50 | 6.9471 | 7.0273 | 7.1075 | 7.1876 | 0.1400 |
| −2.75 | 6.9854 | 7.0650 | 7.1447 | 7.2243 | 0.1400 |
| −3.00 | 7.0236 | 7.1027 | 7.1817 | 7.2608 | 0.1400 |
| −3.25 | 7.0615 | 7.1401 | 7.2186 | 7.2972 | 0.1400 |
| −3.50 | 7.0993 | 7.1774 | 7.2554 | 7.3334 | 0.1400 |
| −3.75 | 7.1369 | 7.2144 | 7.2919 | 7.3694 | 0.1400 |
| −4.00 | 7.1743 | 7.2513 | 7.3283 | 7.4053 | 0.1400 |
| −4.25 | 7.2115 | 7.2880 | 7.3644 | 7.4409 | 0.1400 |
| −4.50 | 7.2484 | 7.3244 | 7.4004 | 7.4764 | 0.1400 |
| −4.75 | 7.2851 | 7.3606 | 7.4361 | 7.5116 | 0.1400 |
| −5.00 | 7.3215 | 7.3965 | 7.4716 | 7.5466 | 0.1400 |
| −5.25 | 7.3577 | 7.4322 | 7.5068 | 7.5813 | 0.1400 |
| −5.50 | 7.3935 | 7.4676 | 7.5417 | 7.6158 | 0.1400 |
| −5.75 | 7.4291 | 7.5027 | 7.5764 | 7.6500 | 0.1400 |
| −6.00 | 7.4643 | 7.5375 | 7.6108 | 7.6840 | 0.1400 |
| −6.25 | 7.4992 | 7.5720 | 7.6448 | 7.7177 | 0.1400 |
| −6.50 | 7.5337 | 7.6062 | 7.6786 | 7.7510 | 0.1400 |
| −6.75 | 7.5679 | 7.6400 | 7.7120 | 7.7841 | 0.1400 |
| −7.00 | 7.6017 | 7.6734 | 7.7451 | 7.8169 | 0.1400 |
| −7.25 | 7.6351 | 7.7065 | 7.7779 | 7.8493 | 0.1400 |
| −7.50 | 7.6681 | 7.7392 | 7.8103 | 7.8813 | 0.1400 |
| −7.75 | 7.7007 | 7.7715 | 7.8423 | 7.9131 | 0.1400 |
| −8.00 | 7.7329 | 7.8034 | 7.8739 | 7.9444 | 0.1400 |
| −8.25 | 7.7646 | 7.8348 | 7.9051 | 7.9754 | 0.1400 |
| −8.50 | 7.7958 | 7.8659 | 7.9359 | 8.0059 | 0.1400 |
| −8.75 | 7.8266 | 7.8964 | 7.9663 | 8.0361 | 0.1400 |
| −9.00 | 7.8569 | 7.9265 | 7.9962 | 8.0659 | 0.1400 |
| −9.25 | 7.8867 | 7.9562 | 8.0257 | 8.0952 | 0.1400 |
| −9.50 | 7.9159 | 7.9853 | 8.0547 | 8.1241 | 0.1400 |
| −9.75 | 7.9446 | 8.0139 | 8.0832 | 8.1525 | 0.1400 |
| −10.00 | 7.9728 | 8.0420 | 8.1113 | 8.1805 | 0.1400 |
| −10.25 | 8.0004 | 8.0696 | 8.1388 | 8.2080 | 0.1400 |
| −10.50 | 8.0275 | 8.0966 | 8.1658 | 8.2350 | 0.1400 |
| −10.75 | 8.0539 | 8.1231 | 8.1923 | 8.2615 | 0.1400 |
| −11.00 | 8.0798 | 8.1490 | 8.2183 | 8.2875 | 0.1400 |
| −11.25 | 8.1050 | 8.1743 | 8.2437 | 8.3130 | 0.1400 |
| −11.50 | 8.1296 | 8.1990 | 8.2685 | 8.3379 | 0.1400 |
| −11.75 | 8.1535 | 8.2231 | 8.2927 | 8.3624 | 0.1400 |
| −12.00 | 8.1768 | 8.2466 | 8.3164 | 8.3862 | 0.1400 |
| −12.25 | 8.1995 | 8.2695 | 8.3395 | 8.4095 | 0.1400 |
| −12.50 | 8.2214 | 8.2917 | 8.3620 | 8.4322 | 0.1400 |
| −12.75 | 8.2427 | 8.3132 | 8.3838 | 8.4544 | 0.1400 |
| −13.00 | 8.2632 | 8.3341 | 8.4050 | 8.4759 | 0.1400 |
| −13.25 | 8.2831 | 8.3543 | 8.4256 | 8.4968 | 0.1400 |
| −13.50 | 8.3022 | 8.3738 | 8.4455 | 8.5171 | 0.1400 |
| −13.75 | 8.3206 | 8.3927 | 8.4648 | 8.5368 | 0.1400 |
| −14.00 | 8.3382 | 8.4108 | 8.4833 | 8.5559 | 0.1400 |
| −14.25 | 8.3551 | 8.4282 | 8.5012 | 8.5743 | 0.1400 |
| −14.50 | 8.3712 | 8.4448 | 8.5184 | 8.5921 | 0.1400 |
| −14.75 | 8.3865 | 8.4607 | 8.5350 | 8.6092 | 0.1400 |
| −15.00 | 8.4011 | 8.4759 | 8.5508 | 8.6256 | 0.1400 |
| −15.25 | 8.4148 | 8.4903 | 8.5658 | 8.6414 | 0.1400 |
| −15.50 | 8.4278 | 8.5040 | 8.5802 | 8.6564 | 0.1400 |
| −15.75 | 8.4399 | 8.5169 | 8.5938 | 8.6708 | 0.1400 |
| −16.00 | 8.4512 | 8.5290 | 8.6067 | 8.6845 | 0.1400 |
| −16.25 | 8.4617 | 8.5403 | 8.6189 | 8.6975 | 0.1400 |
| −16.50 | 8.4714 | 8.5508 | 8.6303 | 8.7097 | 0.1400 |
| −16.75 | 8.4802 | 8.5606 | 8.6409 | 8.7212 | 0.1400 |
| −17.00 | 8.4882 | 8.5695 | 8.6508 | 8.7321 | 0.1400 |
| −17.25 | 8.4954 | 8.5776 | 8.6599 | 8.7421 | 0.1400 |
| −17.50 | 8.5017 | 8.5849 | 8.6682 | 8.7515 | 0.1400 |
| −17.75 | 8.5071 | 8.5914 | 8.6758 | 8.7601 | 0.1400 |
| −18.00 | 8.5117 | 8.5971 | 8.6825 | 8.7679 | 0.1400 |
| −18.25 | 8.5154 | 8.6020 | 8.6885 | 8.7751 | 0.1400 |
| −18.50 | 8.5183 | 8.6060 | 8.6937 | 8.7814 | 0.1400 |
| −18.75 | 8.5203 | 8.6092 | 8.6981 | 8.7870 | 0.1400 |

TABLE IV-continued

Base curve radius = 8.732 mm; $(P_1-P_4)$ = 2.00 Ds

| N ($P_1$) | Central zone ($R_1$) | First Intermediate zone ($R_2$) | Second Intermediate zone ($R_3$) | Outer zone ($R_4$) | C.T. |
|---|---|---|---|---|---|
| −19.00 | 8.5214 | 8.6116 | 8.7017 | 8.7918 | 0.1400 |
| −19.25 | 8.5217 | 8.6131 | 8.7045 | 8.7959 | 0.1400 |
| −19.50 | 8.5211 | 8.6138 | 8.7065 | 8.7992 | 0.1400 |
| −19.75 | 8.5196 | 8.6137 | 8.7077 | 8.8018 | 0.1400 |
| −20.00 | 8.5173 | 8.6127 | 8.7081 | 8.8036 | 0.1400 |

TABLE V

Base curve radius = 9.1 mm; $(P_1-P_4)$ = 1.25 Ds

| N ($P_1$) | Central zone ($R_1$) | First Intermediate zone ($R_2$) | Second Intermediate zone ($R_3$) | Outer zone ($R_4$) | C.T. |
|---|---|---|---|---|---|
| 20.00 | 4.1430 | 4.2432 | 4.3434 | 4.4436 | 1.1163 |
| 19.75 | 4.1663 | 4.2665 | 4.3666 | 4.4668 | 1.0934 |
| 19.50 | 4.1900 | 4.2901 | 4.3902 | 4.4903 | 1.0710 |
| 19.25 | 4.2140 | 4.3141 | 4.4141 | 4.5141 | 1.0492 |
| 19.00 | 4.2384 | 4.3384 | 4.4383 | 4.5383 | 1.0280 |
| 18.75 | 4.2632 | 4.3630 | 4.4629 | 4.5628 | 1.0072 |
| 18.50 | 4.2883 | 4.3880 | 4.4878 | 4.5876 | 0.9869 |
| 18.25 | 4.3137 | 4.4134 | 4.5131 | 4.6127 | 0.9671 |
| 18.00 | 4.3395 | 4.4391 | 4.5386 | 4.6382 | 0.9476 |
| 17.75 | 4.3656 | 4.4651 | 4.5645 | 4.6639 | 0.9287 |
| 17.50 | 4.3921 | 4.4914 | 4.5907 | 4.6900 | 0.9101 |
| 17.25 | 4.4189 | 4.5180 | 4.6172 | 4.7164 | 0.8919 |
| 17.00 | 4.4460 | 4.5450 | 4.6440 | 4.7430 | 0.8740 |
| 16.75 | 4.4735 | 4.5723 | 4.6711 | 4.7700 | 0.8565 |
| 16.50 | 4.5012 | 4.5999 | 4.6986 | 4.7972 | 0.8394 |
| 16.25 | 4.5293 | 4.6278 | 4.7263 | 4.8247 | 0.8226 |
| 16.00 | 4.5578 | 4.6560 | 4.7543 | 4.8526 | 0.8061 |
| 15.75 | 4.5865 | 4.6846 | 4.7826 | 4.8807 | 0.7899 |
| 15.50 | 4.6156 | 4.7134 | 4.8112 | 4.9091 | 0.7740 |
| 15.25 | 4.6450 | 4.7425 | 4.8401 | 4.9377 | 0.7583 |
| 15.00 | 4.6746 | 4.7720 | 4.8693 | 4.9667 | 0.7430 |
| 14.75 | 4.7046 | 4.8017 | 4.8988 | 4.9959 | 0.7279 |
| 14.50 | 4.7350 | 4.8318 | 4.9286 | 5.0254 | 0.7131 |
| 14.25 | 4.7656 | 4.8621 | 4.9586 | 5.0551 | 0.6985 |
| 14.00 | 4.7965 | 4.8927 | 4.9889 | 5.0852 | 0.6842 |
| 13.75 | 4.8277 | 4.9236 | 5.0196 | 5.1155 | 0.6701 |
| 13.50 | 4.8593 | 4.9549 | 5.0504 | 5.1460 | 0.6563 |
| 13.25 | 4.8911 | 4.9864 | 5.0816 | 5.1768 | 0.6426 |
| 13.00 | 4.9233 | 5.0181 | 5.1130 | 5.2079 | 0.6292 |
| 12.75 | 4.9557 | 5.0502 | 5.1447 | 5.2392 | 0.6160 |
| 12.50 | 4.9884 | 5.0826 | 5.1767 | 5.2708 | 0.6030 |
| 12.25 | 5.0214 | 5.1152 | 5.2089 | 5.3027 | 0.5903 |
| 12.00 | 5.0548 | 5.1481 | 5.2414 | 5.3348 | 0.5777 |
| 11.75 | 5.0884 | 5.1813 | 5.2742 | 5.3671 | 0.5653 |
| 11.50 | 5.1222 | 5.2147 | 5.3072 | 5.3997 | 0.5531 |
| 11.25 | 5.1564 | 5.2485 | 5.3405 | 5.4325 | 0.5410 |
| 11.00 | 5.1909 | 5.2824 | 5.3740 | 5.4656 | 0.5292 |
| 10.75 | 5.2256 | 5.3167 | 5.4078 | 5.4989 | 0.5175 |
| 10.50 | 5.2606 | 5.3512 | 5.4418 | 5.5324 | 0.5060 |
| 10.25 | 5.2959 | 5.3860 | 5.4761 | 5.5662 | 0.4947 |
| 10.00 | 5.3315 | 5.4211 | 5.5106 | 5.6002 | 0.4835 |
| 9.75 | 5.3674 | 5.4564 | 5.5454 | 5.6344 | 0.4725 |
| 9.50 | 5.4035 | 5.4919 | 5.5804 | 5.6689 | 0.4617 |
| 9.25 | 5.4398 | 5.5277 | 5.6156 | 5.7035 | 0.4510 |
| 9.00 | 5.4765 | 5.5638 | 5.6511 | 5.7384 | 0.4404 |
| 8.75 | 5.5134 | 5.6001 | 5.6868 | 5.7735 | 0.4301 |
| 8.50 | 5.5505 | 5.6366 | 5.7227 | 5.8088 | 0.4198 |
| 8.25 | 5.5879 | 5.6734 | 5.7588 | 5.8443 | 0.4097 |
| 8.00 | 5.6255 | 5.7104 | 5.7952 | 5.8800 | 0.3998 |
| 7.75 | 5.6634 | 5.7476 | 5.8318 | 5.9160 | 0.3900 |
| 7.50 | 5.7016 | 5.7851 | 5.8686 | 5.9521 | 0.3803 |
| 7.25 | 5.7399 | 5.8227 | 5.9056 | 5.9884 | 0.3707 |
| 7.00 | 5.7785 | 5.8606 | 5.9427 | 6.0249 | 0.3613 |
| 6.75 | 5.8173 | 5.8987 | 5.9801 | 6.0615 | 0.3520 |
| 6.50 | 5.8564 | 5.9370 | 6.0177 | 6.0984 | 0.3429 |
| 6.25 | 5.8956 | 5.9756 | 6.0555 | 6.1354 | 0.3339 |
| 6.00 | 5.9351 | 6.0143 | 6.0934 | 6.1726 | 0.3250 |
| 5.75 | 5.9748 | 6.0532 | 6.1316 | 6.2099 | 0.3162 |
| 5.50 | 6.0147 | 6.0923 | 6.1699 | 6.2474 | 0.3076 |
| 5.25 | 6.0548 | 6.1315 | 6.2083 | 6.2851 | 0.2990 |
| 5.00 | 6.0950 | 6.1710 | 6.2470 | 6.3229 | 0.2906 |
| 4.75 | 6.1355 | 6.2106 | 6.2857 | 6.3609 | 0.2823 |
| 4.50 | 6.1761 | 6.2504 | 6.3247 | 6.3990 | 0.2741 |
| 4.25 | 6.2169 | 6.2903 | 6.3638 | 6.4372 | 0.2661 |
| 4.00 | 6.2578 | 6.3304 | 6.4030 | 6.4756 | 0.2581 |
| 3.75 | 6.2990 | 6.3706 | 6.4423 | 6.5140 | 0.2503 |
| 3.50 | 6.3402 | 6.4110 | 6.4818 | 6.5526 | 0.2425 |
| 3.25 | 6.3816 | 6.4515 | 6.5214 | 6.5913 | 0.2349 |
| 3.00 | 6.4232 | 6.4921 | 6.5611 | 6.6301 | 0.2274 |
| 2.75 | 6.4648 | 6.5329 | 6.6009 | 6.6689 | 0.2200 |
| 2.50 | 6.5066 | 6.5737 | 6.6408 | 6.7079 | 0.2126 |
| 2.25 | 6.5485 | 6.6146 | 6.6808 | 6.7469 | 0.2054 |
| 2.00 | 6.5905 | 6.6557 | 6.7209 | 6.7861 | 0.1983 |
| 1.75 | 6.6326 | 6.6968 | 6.7610 | 6.8252 | 0.1913 |
| 1.50 | 6.6747 | 6.7380 | 6.8012 | 6.8645 | 0.1844 |
| 1.25 | 6.7170 | 6.7792 | 6.8415 | 6.9037 | 0.1776 |
| 1.00 | 6.7592 | 6.8204 | 6.8817 | 6.9430 | 0.1705 |
| 0.75 | 6.8015 | 6.8618 | 6.9220 | 6.9823 | 0.1639 |
| 0.50 | 6.8439 | 6.9032 | 6.9624 | 7.0217 | 0.1574 |
| 0.25 | 6.8864 | 6.9446 | 7.0028 | 7.0610 | 0.1510 |
| 0.00 | 6.9300 | 6.9872 | 7.0444 | 7.1016 | 0.1500 |
| −0.25 | 6.9716 | 7.0278 | 7.0840 | 7.1401 | 0.1400 |
| −0.50 | 7.0155 | 7.0706 | 7.1258 | 7.1809 | 0.1400 |
| −0.75 | 7.0593 | 7.1134 | 7.1675 | 7.2216 | 0.1400 |
| −1.00 | 7.1031 | 7.1562 | 7.2092 | 7.2623 | 0.1400 |
| −1.25 | 7.1468 | 7.1988 | 7.2509 | 7.3029 | 0.1400 |
| −1.50 | 7.1904 | 7.2414 | 7.2924 | 7.3434 | 0.1400 |
| −1.75 | 7.2340 | 7.2840 | 7.3339 | 7.3839 | 0.1400 |
| −2.00 | 7.2775 | 7.3264 | 7.3753 | 7.4242 | 0.1400 |
| −2.25 | 7.3208 | 7.3687 | 7.4166 | 7.4645 | 0.1400 |
| −2.50 | 7.3641 | 7.4109 | 7.4578 | 7.5046 | 0.1400 |
| −2.75 | 7.4072 | 7.4530 | 7.4988 | 7.5446 | 0.1400 |
| −3.00 | 7.4501 | 7.4949 | 7.5397 | 7.5844 | 0.1400 |
| −3.25 | 7.4929 | 7.5366 | 7.5804 | 7.6242 | 0.1400 |
| −3.50 | 7.5355 | 7.5782 | 7.6210 | 7.6637 | 0.1400 |
| −3.75 | 7.5779 | 7.6196 | 7.6613 | 7.7031 | 0.1400 |
| −4.00 | 7.6201 | 7.6608 | 7.7015 | 7.7422 | 0.1400 |
| −4.25 | 7.6620 | 7.7018 | 7.7415 | 7.7812 | 0.1400 |
| −4.50 | 7.7037 | 7.7425 | 7.7813 | 7.8200 | 0.1400 |
| −4.75 | 7.7452 | 7.7830 | 7.8208 | 7.8586 | 0.1400 |
| −5.00 | 7.7864 | 7.8232 | 7.8601 | 7.8969 | 0.1400 |
| −5.25 | 7.8273 | 7.8632 | 7.8991 | 7.9350 | 0.1400 |
| −5.50 | 7.8679 | 7.9029 | 7.9378 | 7.9728 | 0.1400 |
| −5.75 | 7.9082 | 7.9422 | 7.9763 | 8.0103 | 0.1400 |
| −6.00 | 7.9481 | 7.9813 | 8.0144 | 8.0476 | 0.1400 |
| −6.25 | 7.9877 | 8.0200 | 8.0523 | 8.0845 | 0.1400 |
| −6.50 | 8.0270 | 8.0584 | 8.0898 | 8.1212 | 0.1400 |
| −6.75 | 8.0658 | 8.0964 | 8.1269 | 8.1575 | 0.1400 |
| −7.00 | 8.1042 | 8.1340 | 8.1637 | 8.1935 | 0.1400 |
| −7.25 | 8.1422 | 8.1712 | 8.2002 | 8.2291 | 0.1400 |
| −7.50 | 8.1798 | 8.2080 | 8.2362 | 8.2644 | 0.1400 |
| −7.75 | 8.2169 | 8.2444 | 8.2718 | 8.2993 | 0.1400 |
| −8.00 | 8.2536 | 8.2803 | 8.3070 | 8.3338 | 0.1400 |
| −8.25 | 8.2897 | 8.3158 | 8.3418 | 8.3679 | 0.1400 |
| −8.50 | 8.3254 | 8.3508 | 8.3761 | 8.4015 | 0.1400 |
| −8.75 | 8.3605 | 8.3853 | 8.4100 | 8.4348 | 0.1400 |
| −9.00 | 8.3951 | 8.4192 | 8.4434 | 8.4676 | 0.1400 |
| −9.25 | 8.4291 | 8.4527 | 8.4763 | 8.4999 | 0.1400 |
| −9.50 | 8.4625 | 8.4856 | 8.5087 | 8.5318 | 0.1400 |
| −9.75 | 8.4954 | 8.5180 | 8.5406 | 8.5631 | 0.1400 |
| −10.00 | 8.5276 | 8.5498 | 8.5719 | 8.5940 | 0.1400 |
| −10.25 | 8.5592 | 8.5810 | 8.6027 | 8.6244 | 0.1400 |
| −10.50 | 8.5902 | 8.6116 | 8.6329 | 8.6542 | 0.1400 |
| −10.75 | 8.6205 | 8.6415 | 8.6625 | 8.6835 | 0.1400 |
| −11.00 | 8.6502 | 8.6709 | 8.6916 | 8.7123 | 0.1400 |
| −11.25 | 8.6791 | 8.6995 | 8.7200 | 8.7405 | 0.1400 |

TABLE V-continued

Base curve radius = 9.1 mm; (P₁-P₄) = 1.25 Ds

| N (P₁) | Central zone (R₁) | First Intermediate zone (R₂) | Second Intermediate zone (R₃) | Outer zone (R₄) | C.T. |
|---|---|---|---|---|---|
| −11.50 | 8.7073 | 8.7276 | 8.7478 | 8.7681 | 0.1400 |
| −11.75 | 8.7348 | 8.7549 | 8.7750 | 8.7951 | 0.1400 |
| −12.00 | 8.7616 | 8.7815 | 8.8015 | 8.8215 | 0.1400 |
| −12.25 | 8.7876 | 8.8075 | 8.8274 | 8.8473 | 0.1400 |
| −12.50 | 8.8128 | 8.8327 | 8.8525 | 8.8724 | 0.1400 |
| −12.75 | 8.8373 | 8.8572 | 8.8770 | 8.8969 | 0.1400 |
| −13.00 | 8.8609 | 8.8809 | 8.9008 | 8.9208 | 0.1400 |
| −13.25 | 8.8837 | 8.9038 | 8.9239 | 8.9440 | 0.1400 |
| −13.50 | 8.9057 | 8.9260 | 8.9463 | 8.9665 | 0.1400 |
| −13.75 | 8.9269 | 8.9474 | 8.9679 | 8.9884 | 0.1400 |
| −14.00 | 8.9472 | 8.9680 | 8.9887 | 9.0095 | 0.1400 |
| −14.25 | 8.9667 | 8.9877 | 9.0088 | 9.0299 | 0.1400 |
| −14.50 | 8.9852 | 9.0067 | 9.0282 | 9.0496 | 0.1400 |
| −14.75 | 9.0029 | 9.0248 | 9.0467 | 9.0686 | 0.1400 |
| −15.00 | 9.0197 | 9.0421 | 9.0645 | 9.0869 | 0.1400 |
| −15.25 | 9.0355 | 9.0585 | 9.0814 | 9.1043 | 0.1400 |
| −15.50 | 9.0505 | 9.0740 | 9.0975 | 9.1211 | 0.1400 |
| −15.75 | 9.0645 | 9.0887 | 9.1129 | 9.1371 | 0.1400 |
| −16.00 | 9.0776 | 9.1025 | 9.1273 | 9.1522 | 0.1400 |
| −16.25 | 9.0897 | 9.1153 | 9.1410 | 9.1667 | 0.1400 |
| −16.50 | 9.1008 | 9.1273 | 9.1538 | 9.1803 | 0.1400 |
| −16.75 | 9.1110 | 9.1384 | 9.1657 | 9.1931 | 0.1400 |
| −17.00 | 9.1203 | 9.1486 | 9.1768 | 9.2051 | 0.1400 |
| −17.25 | 9.1285 | 9.1578 | 9.1871 | 9.2163 | 0.1400 |
| −17.50 | 9.1358 | 9.1661 | 9.1964 | 9.2267 | 0.1400 |
| −17.75 | 9.1421 | 9.1735 | 9.2049 | 9.2363 | 0.1400 |
| −18.00 | 9.1474 | 9.1799 | 9.2125 | 9.2450 | 0.1400 |
| −18.25 | 9.1517 | 9.1854 | 9.2192 | 9.2529 | 0.1400 |
| −18.50 | 9.1550 | 9.1900 | 9.2250 | 9.2600 | 0.1400 |
| −18.75 | 9.1573 | 9.1936 | 9.2299 | 9.2662 | 0.1400 |
| −19.00 | 9.1586 | 9.1963 | 9.2339 | 9.2716 | 0.1400 |
| −19.25 | 9.1589 | 9.1980 | 9.2371 | 9.2761 | 0.1400 |
| −19.50 | 9.1582 | 9.1988 | 9.2393 | 9.2798 | 0.1400 |
| −19.75 | 9.1565 | 9.1986 | 9.2406 | 9.2827 | 0.1400 |
| −20.00 | 9.1539 | 9.1975 | 9.2411 | 9.2846 | 0.1400 |

TABLE VI

Base curve radius = 9.1 mm; (P₁-P₄) = 2.00 Ds

| N (P₁) | Central zone (R₁) | First Intermediate zone (R₂) | Second Intermediate zone (R₃) | Outer zone (R₄) | C.T. |
|---|---|---|---|---|---|
| 20.00 | 4.1092 | 4.2209 | 4.3325 | 4.4442 | 1.1187 |
| 19.75 | 4.1320 | 4.2438 | 4.3556 | 4.4673 | 1.0958 |
| 19.50 | 4.1551 | 4.2670 | 4.3789 | 4.4908 | 1.0734 |
| 19.25 | 4.1787 | 4.2907 | 4.4027 | 4.5147 | 1.0516 |
| 19.00 | 4.2025 | 4.3146 | 4.4267 | 4.5388 | 1.0303 |
| 18.75 | 4.2267 | 4.3389 | 4.4511 | 4.5633 | 1.0096 |
| 18.50 | 4.2513 | 4.3636 | 4.4759 | 4.5882 | 0.9893 |
| 18.25 | 4.2762 | 4.3885 | 4.5009 | 4.6133 | 0.9694 |
| 18.00 | 4.3014 | 4.4138 | 4.5263 | 4.6387 | 0.9500 |
| 17.75 | 4.3269 | 4.4395 | 4.5520 | 4.6645 | 0.9310 |
| 17.50 | 4.3528 | 4.4654 | 4.5780 | 4.6905 | 0.9124 |
| 17.25 | 4.3790 | 4.4917 | 4.6043 | 4.7169 | 0.8942 |
| 17.00 | 4.4056 | 4.5182 | 4.6309 | 4.7436 | 0.8764 |
| 16.75 | 4.4324 | 4.5451 | 4.6578 | 4.7705 | 0.8589 |
| 16.50 | 4.4596 | 4.5723 | 4.6850 | 4.7978 | 0.8418 |
| 16.25 | 4.4871 | 4.5998 | 4.7125 | 4.8253 | 0.8249 |
| 16.00 | 4.5148 | 4.6276 | 4.7404 | 4.8531 | 0.8084 |
| 15.75 | 4.5429 | 4.6557 | 4.7685 | 4.8812 | 0.7922 |
| 15.50 | 4.5714 | 4.6841 | 4.7969 | 4.9096 | 0.7763 |
| 15.25 | 4.6001 | 4.7128 | 4.8255 | 4.9383 | 0.7607 |
| 15.00 | 4.6291 | 4.7418 | 4.8545 | 4.9672 | 0.7453 |
| 14.75 | 4.6584 | 4.7711 | 4.8838 | 4.9964 | 0.7303 |
| 14.50 | 4.6880 | 4.8007 | 4.9133 | 5.0259 | 0.7154 |
| 14.25 | 4.7179 | 4.8305 | 4.9431 | 5.0557 | 0.7009 |

TABLE VI-continued

Base curve radius = 9.1 mm; (P₁-P₄) = 2.00 Ds

| N (P₁) | Central zone (R₁) | First Intermediate zone (R₂) | Second Intermediate zone (R₃) | Outer zone (R₄) | C.T. |
|---|---|---|---|---|---|
| 14.00 | 4.7481 | 4.8607 | 4.9732 | 5.0857 | 0.6866 |
| 13.75 | 4.7787 | 4.8911 | 5.0035 | 5.1160 | 0.6725 |
| 13.50 | 4.8095 | 4.9218 | 5.0342 | 5.1466 | 0.6586 |
| 13.25 | 4.8405 | 4.9528 | 5.0651 | 5.1774 | 0.6450 |
| 13.00 | 4.8719 | 4.9841 | 5.0963 | 5.2084 | 0.6316 |
| 12.75 | 4.9036 | 5.0156 | 5.1277 | 5.2398 | 0.6184 |
| 12.50 | 4.9355 | 5.0475 | 5.1594 | 5.2714 | 0.6054 |
| 12.25 | 4.9678 | 5.0796 | 5.1914 | 5.3032 | 0.5926 |
| 12.00 | 5.0003 | 5.1119 | 5.2236 | 5.3353 | 0.5800 |
| 11.75 | 5.0331 | 5.1446 | 5.2561 | 5.3676 | 0.5676 |
| 11.50 | 5.0661 | 5.1775 | 5.2889 | 5.4002 | 0.5554 |
| 11.25 | 5.0995 | 5.2107 | 5.3219 | 5.4330 | 0.5434 |
| 11.00 | 5.1331 | 5.2441 | 5.3551 | 5.4661 | 0.5315 |
| 10.75 | 5.1670 | 5.2778 | 5.3886 | 5.4994 | 0.5198 |
| 10.50 | 5.2011 | 5.3117 | 5.4223 | 5.5329 | 0.5083 |
| 10.25 | 5.2355 | 5.3459 | 5.4563 | 5.5667 | 0.4970 |
| 10.00 | 5.2702 | 5.3804 | 5.4905 | 5.6007 | 0.4858 |
| 9.75 | 5.3051 | 5.4151 | 5.5250 | 5.6349 | 0.4748 |
| 9.50 | 5.3403 | 5.4500 | 5.5597 | 5.6694 | 0.4640 |
| 9.25 | 5.3758 | 5.4852 | 5.5946 | 5.7041 | 0.4533 |
| 9.00 | 5.4115 | 5.5206 | 5.6298 | 5.7389 | 0.4428 |
| 8.75 | 5.4474 | 5.5563 | 5.6652 | 5.7740 | 0.4324 |
| 8.50 | 5.4836 | 5.5922 | 5.7008 | 5.8093 | 0.4221 |
| 8.25 | 5.5200 | 5.6283 | 5.7366 | 5.8449 | 0.4120 |
| 8.00 | 5.5566 | 5.6646 | 5.7726 | 5.8806 | 0.4021 |
| 7.75 | 5.5935 | 5.7012 | 5.8088 | 5.9165 | 0.3923 |
| 7.50 | 5.6306 | 5.7380 | 5.8453 | 5.9526 | 0.3826 |
| 7.25 | 5.6680 | 5.7749 | 5.8819 | 5.9889 | 0.3730 |
| 7.00 | 5.7055 | 5.8121 | 5.9188 | 6.0254 | 0.3636 |
| 6.75 | 5.7433 | 5.8495 | 5.9558 | 6.0621 | 0.3544 |
| 6.50 | 5.7813 | 5.8871 | 5.9930 | 6.0989 | 0.3452 |
| 6.25 | 5.8194 | 5.9249 | 6.0304 | 6.1359 | 0.3362 |
| 6.00 | 5.8578 | 5.9629 | 6.0680 | 6.1731 | 0.3273 |
| 5.75 | 5.8964 | 6.0011 | 6.1058 | 6.2105 | 0.3185 |
| 5.50 | 5.9352 | 6.0394 | 6.1437 | 6.2480 | 0.3099 |
| 5.25 | 5.9741 | 6.0780 | 6.1818 | 6.2856 | 0.3013 |
| 5.00 | 6.0132 | 6.1166 | 6.2200 | 6.3235 | 0.2929 |
| 4.75 | 6.0525 | 6.1555 | 6.2585 | 6.3614 | 0.2846 |
| 4.50 | 6.0920 | 6.1945 | 6.2970 | 6.3995 | 0.2764 |
| 4.25 | 6.1316 | 6.2336 | 6.3357 | 6.4377 | 0.2684 |
| 4.00 | 6.1714 | 6.2729 | 6.3745 | 6.4761 | 0.2604 |
| 3.75 | 6.2113 | 6.3124 | 6.4135 | 6.5145 | 0.2526 |
| 3.50 | 6.2513 | 6.3519 | 6.4525 | 6.5531 | 0.2448 |
| 3.25 | 6.2915 | 6.3916 | 6.4917 | 6.5918 | 0.2372 |
| 3.00 | 6.3318 | 6.4314 | 6.5310 | 6.6306 | 0.2297 |
| 2.75 | 6.3722 | 6.4713 | 6.5704 | 6.6695 | 0.2222 |
| 2.50 | 6.4128 | 6.5113 | 6.6099 | 6.7084 | 0.2149 |
| 2.25 | 6.4534 | 6.5514 | 6.6494 | 6.7475 | 0.2077 |
| 2.00 | 6.4941 | 6.5916 | 6.6891 | 6.7866 | 0.2006 |
| 1.75 | 6.5349 | 6.6318 | 6.7288 | 6.8258 | 0.1936 |
| 1.50 | 6.5758 | 6.6722 | 6.7686 | 6.8650 | 0.1867 |
| 1.25 | 6.6167 | 6.7125 | 6.8084 | 6.9043 | 0.1799 |
| 1.00 | 6.6576 | 6.7529 | 6.8482 | 6.9435 | 0.1728 |
| 0.75 | 6.6986 | 6.7933 | 6.8881 | 6.9828 | 0.1662 |
| 0.50 | 6.7397 | 6.8338 | 6.9280 | 7.0222 | 0.1597 |
| 0.25 | 6.7807 | 6.8743 | 6.9680 | 7.0616 | 0.1533 |
| 0.00 | 6.8225 | 6.9156 | 7.0086 | 7.1016 | 0.1500 |
| −0.25 | 6.8630 | 6.9555 | 7.0479 | 7.1404 | 0.1411 |
| −0.50 | 6.9052 | 6.9971 | 7.0890 | 7.1809 | 0.1400 |
| −0.75 | 6.9477 | 7.0390 | 7.1303 | 7.2216 | 0.1400 |
| −1.00 | 6.9901 | 7.0808 | 7.1716 | 7.2623 | 0.1400 |
| −1.25 | 7.0324 | 7.1226 | 7.2127 | 7.3029 | 0.1400 |
| −1.50 | 7.0747 | 7.1643 | 7.2539 | 7.3434 | 0.1400 |
| −1.75 | 7.1168 | 7.2058 | 7.2949 | 7.3839 | 0.1400 |
| −2.00 | 7.1589 | 7.2473 | 7.3358 | 7.4242 | 0.1400 |
| −2.25 | 7.2008 | 7.2887 | 7.3766 | 7.4645 | 0.1400 |
| −2.50 | 7.2426 | 7.3300 | 7.4173 | 7.5046 | 0.1400 |
| −2.75 | 7.2843 | 7.3711 | 7.4578 | 7.5446 | 0.1400 |
| −3.00 | 7.3258 | 7.4120 | 7.4982 | 7.5844 | 0.1400 |
| −3.25 | 7.3672 | 7.4528 | 7.5385 | 7.6242 | 0.1400 |
| −3.50 | 7.4084 | 7.4935 | 7.5786 | 7.6637 | 0.1400 |
| −3.75 | 7.4493 | 7.5339 | 7.6185 | 7.7031 | 0.1400 |

TABLE VI-continued

Base curve radius = 9.1 mm; (P$_1$-P$_4$) = 2.00 Ds

| N (P$_1$) | Central zone (R$_1$) | First Intermediate zone (R$_2$) | Second Intermediate zone (R$_3$) | Outer zone (R$_4$) | C.T. |
|---|---|---|---|---|---|
| −4.00 | 7.4901 | 7.5741 | 7.6582 | 7.7422 | 0.1400 |
| −4.25 | 7.5306 | 7.6142 | 7.6977 | 7.7812 | 0.1400 |
| −4.50 | 7.5709 | 7.6540 | 7.7370 | 7.8200 | 0.1400 |
| −4.75 | 7.6110 | 7.6935 | 7.7760 | 7.8586 | 0.1400 |
| −5.00 | 7.6507 | 7.7328 | 7.8148 | 7.8969 | 0.1400 |
| −5.25 | 7.6902 | 7.7718 | 7.8534 | 7.9350 | 0.1400 |
| −5.50 | 7.7294 | 7.8105 | 7.8916 | 7.9728 | 0.1400 |
| −5.75 | 7.7683 | 7.8489 | 7.9296 | 8.0103 | 0.1400 |
| −6.00 | 7.8068 | 7.8871 | 7.9673 | 8.0476 | 0.1400 |
| −6.25 | 7.8450 | 7.9248 | 8.0047 | 8.0845 | 0.1400 |
| −6.50 | 7.8828 | 7.9623 | 8.0417 | 8.1212 | 0.1400 |
| −6.75 | 7.9203 | 7.9993 | 8.0784 | 8.1575 | 0.1400 |
| −7.00 | 7.9573 | 8.0360 | 8.1148 | 8.1935 | 0.1400 |
| −7.25 | 7.9939 | 8.0723 | 8.1507 | 8.2291 | 0.1400 |
| −7.50 | 8.0302 | 8.1082 | 8.1863 | 8.2644 | 0.1400 |
| −7.75 | 8.0659 | 8.1437 | 8.2215 | 8.2993 | 0.1400 |
| −8.00 | 8.1012 | 8.1787 | 8.2562 | 8.3338 | 0.1400 |
| −8.25 | 8.1360 | 8.2133 | 8.2906 | 8.3679 | 0.1400 |
| −8.50 | 8.1704 | 8.2474 | 8.3245 | 8.4015 | 0.1400 |
| −8.75 | 8.2042 | 8.2811 | 8.3579 | 8.4348 | 0.1400 |
| −9.00 | 8.2375 | 8.3142 | 8.3909 | 8.4676 | 0.1400 |
| −9.25 | 8.2702 | 8.3468 | 8.4233 | 8.4999 | 0.1400 |
| −9.50 | 8.3024 | 8.3789 | 8.4553 | 8.5318 | 0.1400 |
| −9.75 | 8.3340 | 8.4104 | 8.4868 | 8.5631 | 0.1400 |
| −10.00 | 8.3651 | 8.4414 | 8.5177 | 8.5940 | 0.1400 |
| −10.25 | 8.3955 | 8.4718 | 8.5481 | 8.6244 | 0.1400 |
| −10.50 | 8.4253 | 8.5016 | 8.5779 | 8.6542 | 0.1400 |
| −10.75 | 8.4544 | 8.5308 | 8.6072 | 8.6835 | 0.1400 |
| −11.00 | 8.4829 | 8.5594 | 8.6358 | 8.7123 | 0.1400 |
| −11.25 | 8.5107 | 8.5873 | 8.6639 | 8.7405 | 0.1400 |
| −11.50 | 8.5379 | 8.6146 | 8.6913 | 8.7681 | 0.1400 |
| −11.75 | 8.5643 | 8.6412 | 8.7181 | 8.7951 | 0.1400 |
| −12.00 | 8.5900 | 8.6672 | 8.7443 | 8.8215 | 0.1400 |
| −12.25 | 8.6150 | 8.6924 | 8.7698 | 8.8473 | 0.1400 |
| −12.50 | 8.6392 | 8.7170 | 8.7947 | 8.8724 | 0.1400 |
| −12.75 | 8.6627 | 8.7408 | 8.8189 | 8.8969 | 0.1400 |
| −13.00 | 8.6855 | 8.7639 | 8.8423 | 8.9208 | 0.1400 |
| −13.25 | 8.7074 | 8.7863 | 8.8651 | 8.9440 | 0.1400 |
| −13.50 | 8.7285 | 8.8079 | 8.8872 | 8.9665 | 0.1400 |
| −13.75 | 8.7488 | 8.8287 | 8.9085 | 8.9884 | 0.1400 |
| −14.00 | 8.7684 | 8.8487 | 8.9291 | 9.0095 | 0.1400 |
| −14.25 | 8.7870 | 8.8680 | 8.9490 | 9.0299 | 0.1400 |
| −14.50 | 8.8048 | 8.8864 | 8.9680 | 9.0496 | 0.1400 |
| −14.75 | 8.8218 | 8.9041 | 8.9863 | 9.0686 | 0.1400 |
| −15.00 | 8.8379 | 8.9209 | 9.0039 | 9.0869 | 0.1400 |
| −15.25 | 8.8531 | 8.9369 | 9.0206 | 9.1043 | 0.1400 |
| −15.50 | 8.8675 | 8.9520 | 9.0366 | 9.1211 | 0.1400 |
| −15.75 | 8.8809 | 8.9663 | 9.0517 | 9.1371 | 0.1400 |
| −16.00 | 8.8935 | 8.9797 | 9.0660 | 9.1522 | 0.1400 |
| −16.25 | 8.9051 | 8.9923 | 9.0795 | 9.1667 | 0.1400 |
| −16.50 | 8.9158 | 9.0040 | 9.0921 | 9.1803 | 0.1400 |
| −16.75 | 8.9256 | 9.0148 | 9.1039 | 9.1931 | 0.1400 |
| −17.00 | 8.9345 | 9.0247 | 9.1149 | 9.2051 | 0.1400 |
| −17.25 | 8.9424 | 9.0337 | 9.1250 | 9.2163 | 0.1400 |
| −17.50 | 8.9494 | 9.0418 | 9.1343 | 9.2267 | 0.1400 |
| −17.75 | 8.9554 | 9.0490 | 9.1427 | 9.2363 | 0.1400 |
| −18.00 | 8.9605 | 9.0553 | 9.1502 | 9.2450 | 0.1400 |
| −18.25 | 8.9646 | 9.0607 | 9.1568 | 9.2529 | 0.1400 |
| −18.50 | 8.9678 | 9.0652 | 9.1626 | 9.2600 | 0.1400 |
| −18.75 | 8.9700 | 9.0687 | 9.1675 | 9.2662 | 0.1400 |
| −19.00 | 8.9713 | 9.0714 | 9.1715 | 9.2716 | 0.1400 |
| −19.25 | 8.9716 | 9.0731 | 9.1746 | 9.2761 | 0.1400 |
| −19.50 | 8.9709 | 9.0739 | 9.1769 | 9.2798 | 0.1400 |
| −19.75 | 8.9693 | 9.0737 | 9.1782 | 9.2827 | 0.1400 |
| −20.00 | 8.9667 | 9.0727 | 9.1787 | 9.2846 | 0.1400 |

Typically, after production, lens 10 is checked to confirm that the powers of zones 24, 14, 16, and 18 conform respectively to the prescribed near vision correction, the values given by equations (1) and (2) (if the linear progression described above with reference to the equations is applied), and the near vision correction less the preset value. If necessary, the spherical radius of the specific zones are adjusted so that the powers are in conformity with these values.

The inventors have found that multirange contact lenses produced according to the criteria described hereinabove, for a preset value of 1.25 diopters, give good vision for distances from approximately 25 cm to infinity, for wearers having a range of distance corrections that are approximately 0.6 to approximately 2.8 diopters less than the wearer's near correction. For a preset value of 2.00 diopters, the range of distance corrections is approximately 1.5 to approximately 4.0 diopters. For all preset values, good vision occurs for a range of distance corrections better than 2 diopters.

Lens 10 may be produced by any contact lens process known in the art, such as, but not limited to, cutting on a lathe or molding. Typically, radius transitions between zones, i.e., at zone edges 26, 28, and 30, are substantially sharp, and the method of production for lens 10 is typically chosen so as to give substantially sharp transitions. Consequently, within specific zones 24, 14, 16, and 18, each zone is formed to have a substantially constant power. The inventors have found that a process of molding gives suitably acute radius transitions. Alternatively, lens 10 may be formed by cutting on a lathe, followed by buffing.

The description hereinabove for lens 10 has assumed that there are two intermediate annular zones between central zone 24 and the outer annular zone 18. It will be appreciated that the scope of the present invention includes whole numbers of intermediate annular zones other than two, wherein the powers of such intermediate zones form, when taken together with the central zone power and the outer annular zone power, a monotonic progression.

In some embodiments of the present invention, near surface 22 is implemented as a toric curve, e.g., to correct for astigmatism, the toric curve having two different radii of curvature producing two respective powers. Typically, two radii of curvature $R_1$, for each power, are calculated, and the values are averaged to find an actual value of $R_1$. A similar averaging procedure is applied to find actual values to use for $R_2$, $R_3$, and $R_4$. The description with respect to FIG. 2 below describes in more detail how embodiments of the present invention may be used to correct for astigmatism.

Figure 2:
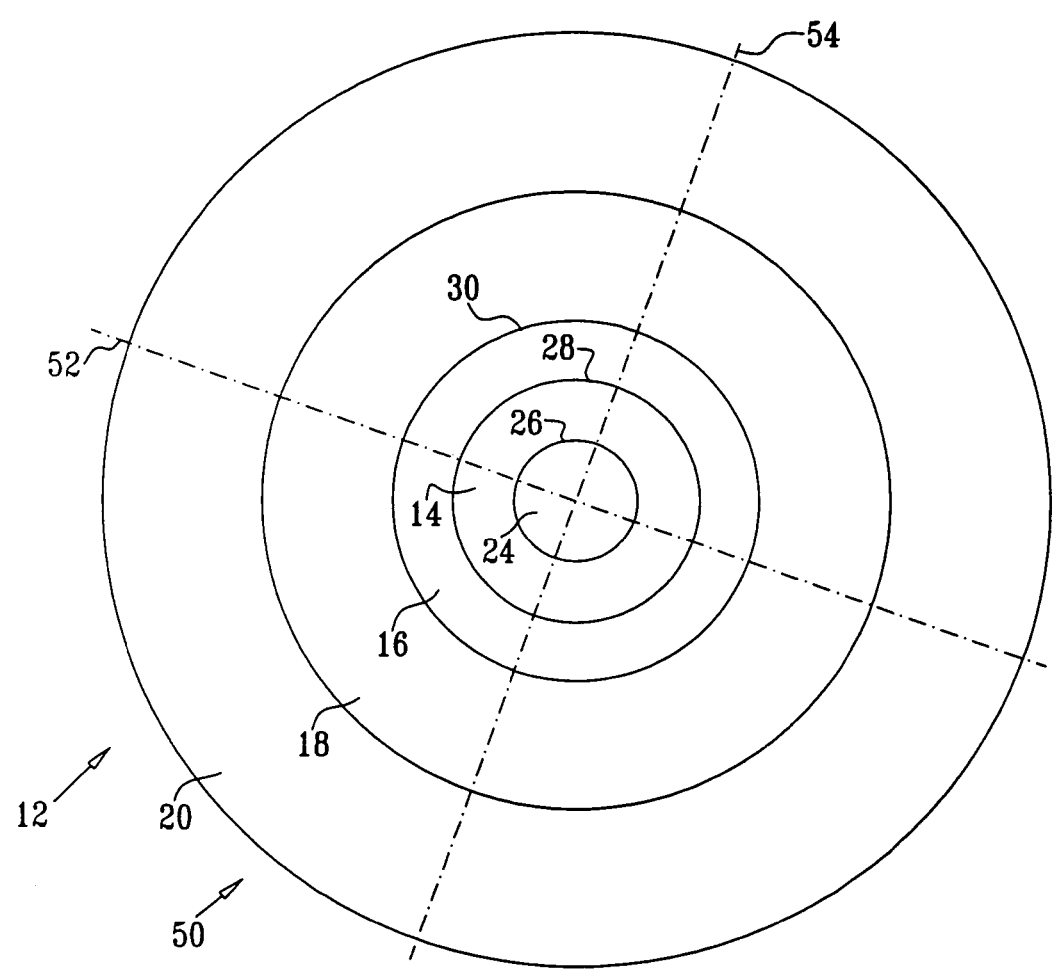
FIG. 2 is a schematic top view of a multirange contact lens, according to an embodiment of the present invention.

FIG. 2 is a schematic top view of a multirange contact lens 50, according to an embodiment of the present invention. Apart from the differences described below, the operation of lens 50 is generally similar to that of lens 10 (FIG. 1), such that parts of the lenses indicated by the same reference numerals in both lenses 50 and 10 are generally similar in construction and in operation.

Rather than having a single spherical curvature, as described above for lens 10, in lens 50 each of zones 24, 14, 16, and 18, has a first cylindrical radius of curvature, $R_{1a}$, $R_{2a}$, $R_{3a}$, and $R_{4a}$ along an axis 52, and a second cylindrical radius of curvature $R_{1b}$, $R_{2b}$, $R_{3b}$, and $R_{4b}$ along an axis 54. Thus, each zone 24, 14, 16, and 18, acting together with near surface 22 having a single spherical radius curvature, generates a first set of powers, $P_{1a}$, $P_{2a}$, $P_{3a}$, and $P_{4a}$ along axis 52, and a second set of powers, $P_{1b}$, $P_{2b}$, $P_{3b}$, and $P_{4b}$ along axis 54, so that lens 50 is able to correct astigmatism of a wearer of the lens.

It will be appreciated that astigmatism may also be corrected either by having near surface 22 have two different cylindrical radii of curvature $R_{basea}$, $R_{baseb}$, or by each zone 24, 14, 16, and 18, of far surface 12 having two different cylindrical radii of curvature (as described hereinabove), or by both near surface 22 and the zones of far surface 12 each having two different cylindrical radii of curvature.

Typically, the differences $(P_{1a}-P_{1b})$, $(P_{2a}-P_{2b})$, $(P_{3a}-P_{3b})$, and $(P_{4a}-P_{4b})$ are set to be approximately equal, and correspond with an astigmatic factor, also termed the "cylinder" value, of the eye of the lens wearer. Furthermore, the angle made by axis 52 is assumed to correspond with the "axis" value of the lens prescription.

In use, for lens 50 to correctly compensate the astigmatism of the eye for which it has been made, the lens must be maintained in alignment in the user's eye, so that it does not rotate. Methods are known in the art for maintaining the alignment, including weighting a lower edge of lens 50 and/or removing a portion of an edge of the lens so that the act of blinking aligns the lens. All such methods known in the art are assumed to be comprised within the scope of the present invention.

Figure 3:
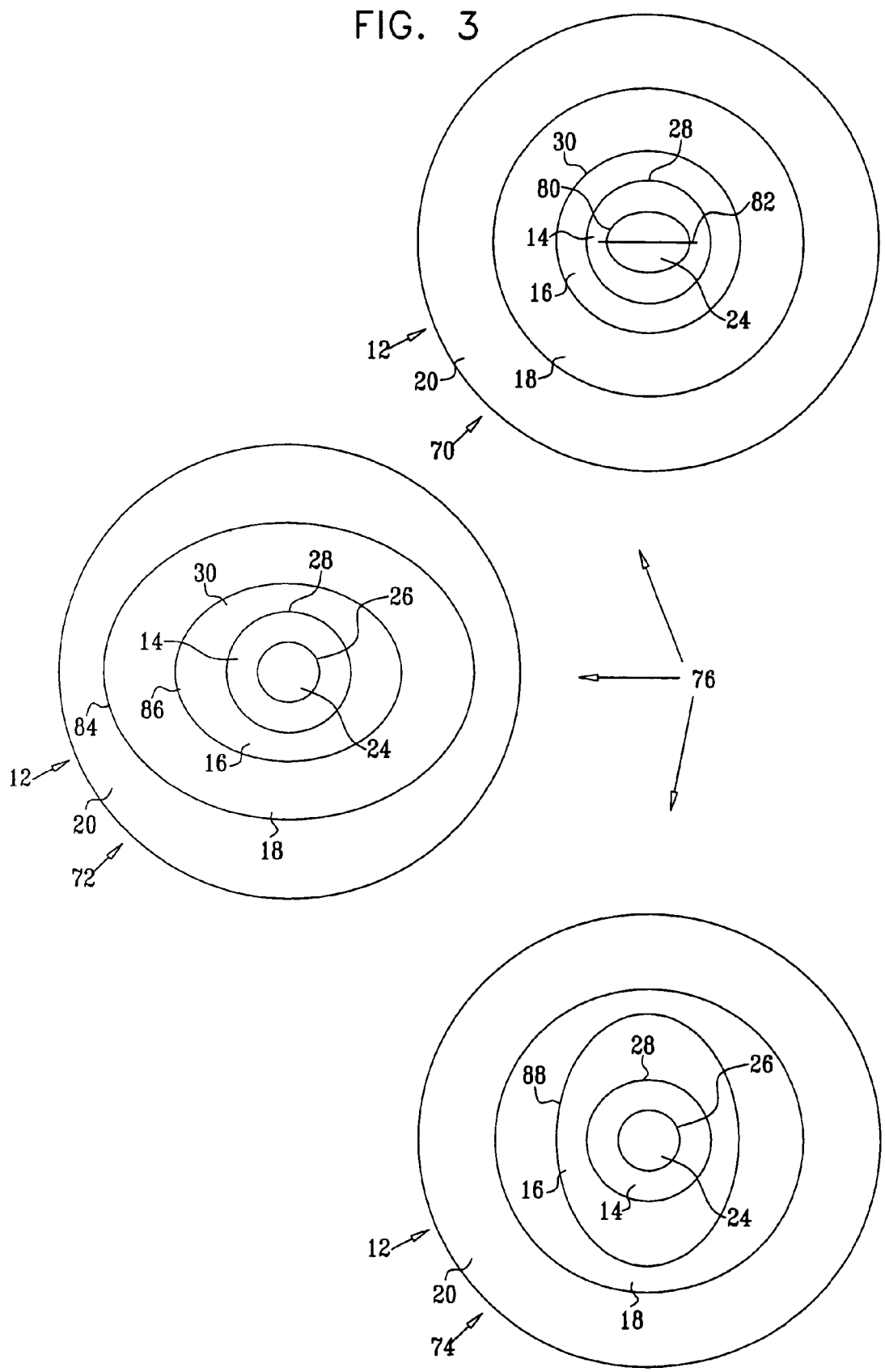
FIG. 3 shows schematic top views of a number of multirange contact lenses, according to an embodiment of the present invention.

FIG. 3 shows schematic top views of multirange contact lenses 70, 72 and 74 according to an embodiment of the present invention. Hereinbelow, lenses 70, 72, and 74 are also generically termed lenses 76. Apart from the differences described below, the operation of lenses 76 is generally similar to that of lens 10 (FIG. 1), such that parts of the lenses indicated by the same reference numerals in lenses 76 and in lens 10 are generally similar in construction and in operation. In addition to compensating for the lack of accommodation typically occurring in presbyopes by providing a lens that allows the user to focus near and distant objects, each of lenses 76 improves the peripheral vision of the user.

A number of factors are known to affect the ability of a person to perceive and respond to objects in the periphery of their direct gaze. Such factors include how well peripheral objects are focussed onto the retina. As described in more detail below, peripheral vision may be enhanced by forming one or more of the zones of each of lenses 76 to have a non-circular edge shape.

In lens 70, zone 24 is configured to have an oval edge 80. In one embodiment, edge 80 is typically approximately elliptical in shape, having a major axis 82 in an approximately horizontal direction. During use of lens 70, axis 82 may be maintained in its horizontal alignment by one of the methods referred to above. Making zone 24 in the form of a horizontally elongated oval improves a user's peripheral vision, particularly the peripheral vision of objects which are close to the user, and which would be well focussed if they were directly observed by the user. The improvement in peripheral vision is typically for objects that are in a horizontal peripheral region, corresponding to the horizontal elongation of edge 80.

The principle of enhancing the peripheral vision by altering the shape of one or more of the edges of one or more of zones 24, 14, 16, and/or 18 to be non-circular may be advantageously applied in cases where a user is known to require a specific type of peripheral vision.

As a first example, illustrated by lens 72, if the user's occupation is as a driver, horizontal far field region peripheral vision may be important, so that the driver is quickly aware of distant objects viewed in one or more mirrors, while the gaze of the driver is directed straight ahead. In this case, zone 18 of lens 72 may be configured as a horizontally elongated oval, having an elongated outer edge 84. Optionally an edge 86, separating zones 18 and 16, may also be elongated, typically having a horizontal elongation as is illustrated in FIG. 3.

As a second example, illustrated by lens 74, the user may be a basketball player, where vertical medium field peripheral vision is important, so that the player is able to see the basket well, while looking at the floor. In this case zone 16 may be configured with a vertically elongated periphery, having a vertically elongated outer edge 88.

It will be appreciated that for zones other than central zone 24, the inner and/or the outer edge of the zone may be made non-circular. It will also be appreciated that the one or more non-circular edges of a zone used to enhance peripheral vision do not need to have any particular symmetry, and may have no symmetry whatsoever. Thus, in lens 72, edge 84 may be elongated more to the left than to the right, so as to enhance the peripheral vision on the left side of the driver more than on the right side. Also, in lens 74, edge 88 may be elongated more up than down, so that the basketball player's peripheral vision is preferentially enhanced upwards.

In some embodiments of the present invention, the non-circular edge may be used both to enhance peripheral vision, and also to maintain the alignment of the lens while it is in use. For example, in lens 72, eye blinking may interact with the elongated oval zone 24 to maintain the lens horizontal.

It will be appreciated that a multirange contact lens combining the principles described above with reference to both FIG. 2 and FIG. 3 may be implemented. Such a multirange lens is able to alter the peripheral vision and correct astigmatism of the wearer.

Contact lenses such as multirange contact lenses 10, 50, and 76, are typically produced as described above, by using a transparent material having one refractive index, and adjusting curvatures of the zones of the material to form the required different powers. Transparent materials having variable refractive indices are known in the art, such as are used to produce graded index (GRIN) lenses, and a variable refractive index material may be used to produce a multirange contact lens having powers substantially as described above for lenses 10, 50, and 76. All such lenses are assumed to be comprised within the scope of the present invention.

As will be appreciated by those skilled in the art, for any region of a lens using a variable refractive index material, the curvature of the zone of the region, the base curve, and the range and distribution of the refractive index of the material between the zone and the base curve all contribute to the overall power generated for the region.

It will thus be appreciated that the power of any specific zone, the base curve, and the transparent material therebetween, may be generated by adjusting the curvature of the zone and the base curve, and by selecting an appropriate range and spatial distribution of the refractive indices of the transparent material.

Figure 4:
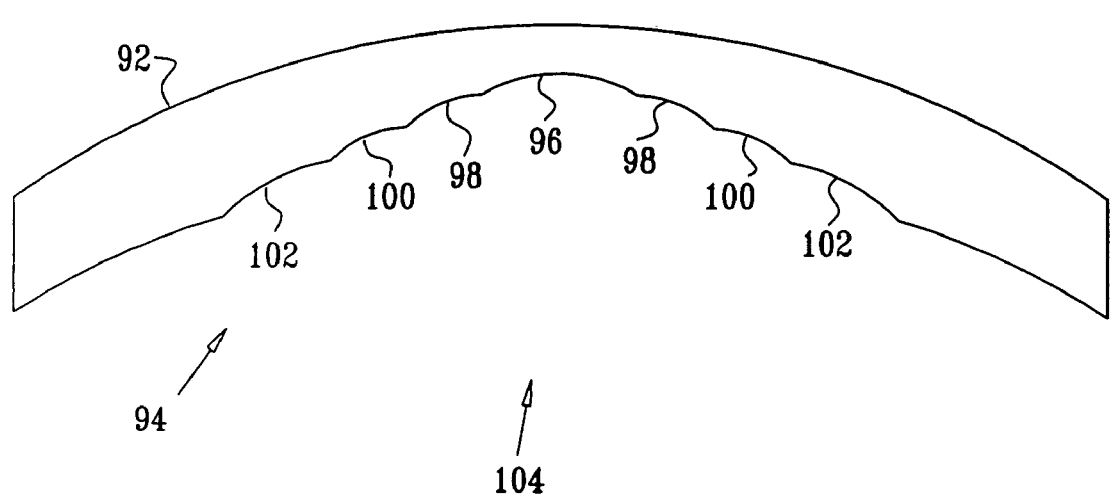
FIG. 4 is a schematic cross-section of a mold, according to an embodiment of the present invention.

FIG. 4 is a schematic cross-section of a mold 90, according to an embodiment of the present invention. It will be appreciated that multirange contact lenses 10, 50, and 76, or lenses incorporating combinations of the principles of operation thereof, improve vision by effectively altering the existing corrective power of the eye upon which they are placed. The eye's corrective power is predominantly generated by the cornea, with smaller contributions from the internal lens of the eye, and from the vitreous and aqueous humors. Altering the shape of the cornea so that it forms zones corresponding to zones 24, 14, 16, and 18, in both edge shape and in power, thus provides an alternative and/or an additional method for improving the vision of the eye.

Mold 90 comprises an outer surface 92 which is generally spherically curved. The mold has an inner surface 94 which is generally in the form of zones 96, 98, 100, 102, the zones of the mold being formed to be respectively generally "female" versions of zones 24, 14, 16, 18, if the latter are considered to be "males." Zones 96, 98, 100, and 102 are also generically referred to herein as mold zones 104. Mold 90 is positioned on the cornea of an eye, and zones 104 act to reshape the cornea so that the reshaped cornea corresponds with zones 24, 14, 16, 18. The mold is typically positioned on the cornea of the wearer before sleep. Alternatively or additionally, the wearer may position the mold on the cornea at any other suitable time.

Specific dimensions of each of zones 104 of mold 90 are typically determined from initial measurements of curvature of the cornea of the eye of the wearer using the mold, and from calculated parameters for a multirange contact lens in the form of lens 10, 50 or one of lenses 76. New zonal curvatures for the cornea are then determined, using respective desired changes in power for each zone, and assuming a refractive index for the cornea approximately equal to 1.38.

For example, a presbyope is determined to have a corneal spherical curvature of 7.7 mm, and so has an unadjusted cornea power of 49.3 D. It is determined that lens 10, having zone powers for zones 24, 14, 16, and 18 of $P_1=+6.25$ Ds, $P_2=+5.83$ Ds, $P_3=+5.42$ Ds, and $P_4=+5.00$ Ds, would correct the vision of the presbyope. To reproduce the effect of lens 10, mold 90 is prepared. To effect the same power changes as the zones of lens 10, zones 96, 98, 100, and 102, have respective spherical radii of curvatures approximately equal to 6.84 mm, 6.89 mm, 6.94 mm, and 7.00 mm. As for lens 10, zones 104 are typically formed to have substantially similar circular outlines of approximate diameters 2.5 mm, 3.5 mm, 4.5 mm, and 9 mm. However, rather than having generally sharp edges between the zones, edges of mold zones 104 are typically rounded, to avoid damage to the cornea.

If mold 90 is to replace a multirange lens such as lens 50 or one of lenses 76, those skilled in the art will be able to adapt the explanation given above with respect to lens 10, *mutatis mutandis*, to generate the required cylindrical radii of curvature and the dimensions of edges of zones 104.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A mold for shaping a cornea of a user of the mold, the mold including a surface which comprises:
   a central zone which is curved and which is adapted to shape the cornea in a central corneal region to have a central zone single-valued refractive power;
   an outer zone which is curved and which is adapted to shape the cornea in an outer corneal region to have an outer zone single-valued refractive power which is less than the central zone single-valued refractive power; and
   an intermediary region, intermediate the central zone and the outer zone, comprising one or more contiguous intermediate zones, each of which is curved and which is adapted to shape the cornea to have respective one or more intermediate zone single-valued refractive powers defining a monotonic progression of decreasing refractive power from the central zone to the outer zone.

2. The mold according to claim 1, wherein the central zone single-valued refractive power is selected to correct near vision of the user.

3. The mold according to claim 1, wherein the outer zone single-valued refractive power is between approximately 1 diopter and approximately 2.5 diopters less than the central zone single-valued refractive power.

4. The mold according to claim 1, wherein the central zone, the one or more intermediate zones, and the outer zone are separated from each other by edges, at least one of which is non-circular.

5. A method for shaping a cornea, comprising:
   providing a mold having a surface which comprises:
   a central zone which is curved and which is adapted to shape the cornea in a central corneal region to have a central zone single-valued refractive power,
   an outer zone which is curved and which is adapted to shape the cornea in an outer corneal region to have an outer zone single-valued refractive power which is less than the central zone single-valued refractive power, and
   an intermediary region, intermediate the central zone and the outer zone, comprising one or more contiguous intermediate zones, each of which is curved and which is adapted to shape the cornea to have respective one or more intermediate zone single-valued refractive powers defining a monotonic progression of decreasing refractive power from the central zone to the outer zone; and
   applying the mold to the cornea.

6. The method according to claim 5, wherein the central zone single-valued refractive power is selected to correct near vision of the user.

7. The method according to claim 5, wherein the outer zone single-valued refractive power is between approximately 1 diopter and approximately 2.5 diopters less than the central zone refractive power.

8. The method according to claim 5, wherein the central zone, the one or more intermediate zones, and the outer zone are separated from each other by edges, at least one of which is non-circular.

9. A mold for shaping a cornea of a user of the mold, the mold including a surface which comprises:
   a central zone which is curved and which is adapted to shape the cornea in a central corneal region to have a first cylindrical curvature along a first axis and a second cylindrical curvature, different from the first cylindrical curvature, along a second axis, and which is configured to generate a first central-zone refractive power along the first axis and a second central-zone refractive power along the second axis, the first and second central-zone refractive powers differing by an astigmatic factor;
   an outer zone which is curved and which is adapted to shape the cornea in an outer corneal region to have a third cylindrical curvature along the first axis and a fourth cylindrical curvature, different from the third cylindrical curvature, along the second axis, and which is configured to generate a first outer-zone refractive power along the first axis which is less than the first central-zone power and a second outer-zone refractive power along the second axis which is less than the first outer-zone refractive power by the astigmatic factor; and
   an intermediary region, intermediate the central zone and the outer zone, comprising one or more contiguous intermediate zones, each of which is curved and which is adapted to shape the cornea to have a respective fifth cylindrical curvature along the first axis and a sixth cylindrical curvature, different from the fifth cylindrical curvature, along the second axis, so that the one or more intermediate zones generate respectively one or more first intermediate-zone refractive powers along the first axis defining a first monotonic progression of decreasing refractive power from the first central-zone refractive power to the first outer-zone refractive power, and one or more second intermediate-zone refractive powers along the second axis defining a second monotonic progression of decreasing refractive power from the second central zone refractive power to the second outer zone refractive power.

10. A method for shaping a cornea, comprising: providing a mold having a surface which comprises:

a central zone which is curved and which is adapted to shape the cornea in a central corneal region to have a first cylindrical curvature along a first axis and a second cylindrical curvature, different from the first cylindrical curvature, along a second axis, and which is configured to generate a first central-zone refractive power along the first axis and a second central-zone refractive power along the second axis, the first and second central-zone refractive powers differing by an astigmatic factor;

an outer zone which is curved and which is adapted to shape the cornea in an outer corneal region to have a third cylindrical curvature along the first axis and a fourth cylindrical curvature, different from the third cylindrical curvature, along the second axis, and which is configured to generate a first outer-zone refractive power along the first axis which is less than the first central-zone power and a second outer-zone refractive power along the second axis which is less than the first outer-zone refractive power by the astigmatic factor; and an intermediary region, intermediate the central zone and the outer zone, comprising one or more contiguous intermediate zones, each of which is curved and which is adapted to shape the cornea to have a respective fifth cylindrical curvature along the first axis and a sixth cylindrical curvature, different from the fifth cylindrical curvature, along the second axis, so that the one or more intermediate zones generate respectively one or more first intermediate-zone refractive powers along the first axis defining a first monotonic progression of decreasing refractive power from the first central-zone refractive power to the first outer-zone refractive power, and one or more second intermediate-zone refractive powers along the second axis defining a second monotonic progression of decreasing refractive power from the second central zone refractive power to the second outer zone refractive power; and applying the mold to the cornea.

* * * * *